(12) United States Patent
Donahoe et al.

(10) Patent No.: US 8,733,168 B2
(45) Date of Patent: May 27, 2014

(54) APPARATUS, SYSTEM AND METHOD EMPLOYING ARROW FLIGHT-DATA

(75) Inventors: Robert V. Donahoe, Newton, MA (US); John Barton, Mallow (IE); Jan Vcelak, Kladno (CZ)

(73) Assignee: Full Flight Technology, LLC, Newton, MA (US)

( * ) Notice: Subject to any disclaimer, the term of this patent is extended or adjusted under 35 U.S.C. 154(b) by 418 days.

(21) Appl. No.: 13/004,593

(22) Filed: Jan. 11, 2011

(65) Prior Publication Data

US 2011/0226038 A1    Sep. 22, 2011

Related U.S. Application Data

(60) Provisional application No. 61/293,757, filed on Jan. 11, 2010.

(51) Int. Cl.
*G01P 3/64* (2006.01)

(52) U.S. Cl.
USPC .......................................................... 73/488

(58) Field of Classification Search
USPC ........................................ 73/12.05, 488, 167
See application file for complete search history.

(56) References Cited

U.S. PATENT DOCUMENTS

| | | | |
|---|---|---|---|
| 3,790,948 A | 2/1974 | Ratkovich | |
| 4,421,319 A | 12/1983 | Murphy | |
| 4,547,837 A | 10/1985 | Bennett | |
| 4,675,683 A | 6/1987 | Robinson et al. | |
| 4,704,612 A | 11/1987 | Boy et al. | |
| 4,749,198 A | 6/1988 | Brailean | |
| 4,845,690 A | 7/1989 | Oehler | |
| 4,988,877 A * | 1/1991 | Stokowksi et al. | ........ 250/358.1 |
| 4,989,881 A | 2/1991 | Gamble | |
| 5,058,900 A | 10/1991 | Denen | |
| 5,141,229 A | 8/1992 | Roundy | |
| 5,157,405 A | 10/1992 | Wycoff et al. | |
| 5,425,542 A | 6/1995 | Blackwood et al. | |
| 5,525,804 A * | 6/1996 | MacArthur et al. | .......... 250/374 |
| 5,802,726 A * | 9/1998 | Trosper et al. | .................. 33/265 |
| 5,988,645 A | 11/1999 | Downing | |
| 6,027,421 A | 2/2000 | Adams, Jr. | |
| 6,029,120 A | 2/2000 | Dilger | |
| 6,191,574 B1 | 2/2001 | Dilger | |

(Continued)

FOREIGN PATENT DOCUMENTS

KR    200272126    4/2002

OTHER PUBLICATIONS

Sensors, 2011 IEEE , Barton J., Oct. 2011.*

(Continued)

*Primary Examiner* — Peter Macchiarolo
*Assistant Examiner* — Mohammed Keramet-Amircolai
(74) *Attorney, Agent, or Firm* — Rhodes Donahoe, LLC

(57) ABSTRACT

In one aspect, a method of determining an instantaneous speed of an arrow, includes determining a time-of-flight of the arrow; determining a distance between a location from which the arrow is loosed and a location of a target-face; providing, with an apparatus included in the arrow, data from at least a portion of a free flight of the arrow; and determining the instantaneous speed of the arrow for at least one point of the free-flight by employing each of: a) the time-of-flight; b) the distance; and c) at least some of the data provided by the apparatus.

23 Claims, 16 Drawing Sheets

(56) References Cited

U.S. PATENT DOCUMENTS

| | | | |
|---|---|---|---|
| 6,209,820 | B1 | 4/2001 | Golan et al. |
| 6,390,642 | B1 | 5/2002 | Simonton |
| 6,604,946 | B2 | 8/2003 | Oakes |
| 6,623,385 | B1 | 9/2003 | Cole et al. |
| 7,095,312 | B2 | 8/2006 | Erario et al. |
| 7,109,722 | B2 * | 9/2006 | Chamberlin et al. ......... 324/551 |
| 7,115,055 | B2 | 10/2006 | Palomake et al. |
| 7,165,543 | B2 | 1/2007 | Simo et al. |
| 7,316,625 | B2 | 1/2008 | Takahashi |
| 7,331,887 | B1 | 2/2008 | Dunn |
| 7,337,773 | B2 | 3/2008 | Simo et al. |
| 7,385,195 | B2 * | 6/2008 | Yamada et al. ............... 250/307 |
| 7,565,147 | B2 * | 7/2009 | Simons et al. ................ 455/446 |
| 2002/0123386 | A1 | 9/2002 | Perlmutter |
| 2002/0134153 | A1 | 9/2002 | Grenlund |
| 2004/0014010 | A1 | 1/2004 | Swenson et al. |
| 2005/0275552 | A1 * | 12/2005 | Chamberlin et al. ......... 340/647 |
| 2005/0288119 | A1 | 12/2005 | Wang et al. |
| 2006/0052173 | A1 | 3/2006 | Telford |
| 2006/0278080 | A1 * | 12/2006 | Li et al. ............................ 96/18 |
| 2007/0167169 | A1 * | 7/2007 | Simons et al. ............. 455/456.1 |
| 2007/0206203 | A1 * | 9/2007 | Trainer ......................... 356/521 |
| 2008/0176681 | A1 | 7/2008 | Donahoe |
| 2008/0218738 | A1 * | 9/2008 | Trainer ........................... 356/72 |
| 2008/0221711 | A1 * | 9/2008 | Trainer ........................... 700/54 |
| 2008/0287229 | A1 * | 11/2008 | Donahoe ....................... 473/570 |
| 2009/0229784 | A1 * | 9/2009 | Rohr ............................ 165/11.1 |
| 2011/0202152 | A1 * | 8/2011 | Barton et al. ................... 700/91 |
| 2012/0038366 | A1 * | 2/2012 | Froman ......................... 324/537 |
| 2012/0286172 | A1 * | 11/2012 | Coulson et al. ............... 250/489 |

OTHER PUBLICATIONS

Paul E. Klopsteg, "Physics of Bows and Arrows", American Journal of Physics, Aug. 1943, vol. 11, pp. 175-192.

International Search Report from corresponding International Application No. PCT/US2008/051344 (dated May 14, 2008).

Easton, "Arrow Tuning and Maintenance Guide", Apr. 1999, 2nd Edition, pp. 1-32, Salt Lake City, Utah.

Davey T.W. Fong, Joe C.Y. Wong, Alan H.F. Lam, Raymond H.W. Lam, Wen J. Li, "a Wireless Motion Sensing System Using ADLX MEMS Accelerometers for Sports Science Applications", pp. 5635-5640, Proceedings of the 5th World Congress on Intelligent Control and Automation, Jun. 15-19, 2004, Hangzhou, P.R. China.

Anwar Sadat, Hongwei Qu, Chuanzhao Yu, Jiann S. Yuan, Huikai, "Low-Power CMOS Wireless MEMS Motion Sensor for Physiological Activity Monitoring", IEEE Transactions on Circuits and Systems, Dec. 2005, vol. 52, No. 12, pp. 2539-2551.

O'Flynn et al., "The Development of a Novel Miniaturized Modular Platform for Wireless Sensor Networks", Proc. The Fourth International Conference on Information Processing in Sensor Networks (ISPN'05), UCLA, Los Angeles, California, US, pp. 370-375, Apr. 24-27, 2005.

Barton et al., "Design, Fabrication and Testing of Miniaturised Wireless Inertial Measurement Units (IMU)", Electronic Components and Technology Conference 2007, pp. 1143-1148, May 29-Jun. 1, 2007.

Srinivasan et al., "Towards automatic detection of falls using wireless sensors", Proc. 29th Annual International Conference of the IEEE EMBS Cite Internationale, Lyon, France, pp. 1379-1382, Aug. 23-26, 2007.

Chung et al., "A Fusion Health Monitoring Using ECG and Accelerometer sensors for Elderly Persons at Home", Proc. 29th Annual International Conference of the IEEE EMBS Cite Internationale, Lyon, France, pp. 3818-3821, Aug. 23-26, 2007.

Lee et al., "Implementation of Accelerometer Sensor Module and Fall Detection Monitoring System based on Wireless Sensor Network", Proc. 29th Annual International Conference of the IEEE EMBS Cite Internationale, Lyon, France, pp. 2315-2318, Aug. 23-26, 2007.

Purwar et al., "Activity Monitoring from Real-Time Triaxial Accelerometer data using Sensor Network", International Conference on Control Automation and Systems 2007, in COEX, Seoul, Korea, pp. 2402, Oct. 17-20, 2007.

Hyatt, C., "Wireless Stimulus-Reflex Detection for Neonatal Monitoring", Circuits and Systems, 2007. ISCAS 2007. IEEE International Symposium, pp. 565-568, May 27-30, 2007.

Tapia et al., "Real-Time Recognition of Physical Activities and Their Intensities Using Wireless Accelerometers and a Heart Rate Monitor", Boston MA, Oct. 11-13, 2007.

International Search Report from corresponding International Application No. PCT/US2010/062626 (dated Sep. 29, 2011).

* cited by examiner

| Archer | Max Speed | Impact Speed | Impact Kinetic Energy | Impact Momentum | Time-of-Flight |
|---|---|---|---|---|---|
| Sam Date | 305.7 | 293.5 | 72.3 | 16.7 | 313.6 |
| Steven Wonder | 323.0 | 313.2 | 73.4 | 16.9 | 298.0 |
| Brett Simon | 298.7 | 292.9 | 70.8 | 16.2 | 343.2 |
| | | | | | |
| | | | | | |
| | | | | | |
| | | | | | |
| | | | | | |
| | | | | | |

*FIG. 14*

Plot of accelerometer output versus time

APPARATUS, SYSTEM AND METHOD EMPLOYING ARROW FLIGHT-DATA

RELATED APPLICATIONS

This application claims benefit under 35 U.S.C.s. 119(e) to U.S. Provisional Application Ser. No. 61/293,757, entitled "APPARATUS, SYSTEM AND METHOD EMPLOYING ARROW FLIGHT-DATA," filed Jan. 11, 2010 which is incorporated by to reference herein in its entirety.

BACKGROUND OF INVENTION

1. Field of Invention

Embodiments of the invention generally relate to the field of archery, more specifically at least one embodiment relates to apparatus systems and methods employing arrow flight-data.

2. Discussion of Related Art

U.S. patent application Ser. No. 12/016,019 entitled SYSTEMS AND METHODS FOR ARCHERY EQUIPMENT, and Ser. No. 12/175,066 entitled APPARATUS, SYSTEM AND METHOD FOR ARCHERY EQUIPMENT, which are each incorporated by reference herein in their entirety, describe embodiments of electronic apparatus included in an arrow. In some of the embodiments described therein, the apparatus is included in an arrowtip, arrow shaft and/or nock.

SUMMARY OF INVENTION

The study of arrow flight and flight-dynamics can include the capture and processing of flight-data where time-of-flight and the distance of the shot are employed. In addition, data acquired in the time domain can be measured for frequency content to assist in analysis of the flight dynamics. In accordance with one embodiment, frequency analysis is performed on accelerometer output data, for example, to perform vibration analysis on at least a portion of the arrow's flight-data.

According to one embodiment, electronic archery systems including a docking station, electronic field point and/or electronic nock are employed for generation, acquisition and display of arrow flight characteristics. In some embodiments, the systems provide information concerning flight stability and are employed for equipment tuning. According to other embodiments, the systems are employed for determining arrow speed, energy and/or momentum.

In one aspect, a method of determining an instantaneous speed of an arrow, includes determining a time-of-flight of the arrow; determining a distance between a location from which the arrow is loosed and a location of a target-face; providing, with an apparatus included in the arrow, data from at least a portion of a free flight of the arrow; and determining the instantaneous speed of the arrow for at least one point of the free-flight by employing each of: a) the time-of-flight; b) the distance; and c) at least some of the data provided by the apparatus. In one embodiment, the time-of-flight is determined with data provided by at least one of a shock sensor and an accelerometer included in the apparatus. In a further embodiment, a start of a free-flight of the arrow is determined with data provided by at least one of the shock sensor and the apparatus. In still another embodiment, the impact of the arrow with the target-face is determined with data provided by at least one of the shock sensor and the accelerometer.

According to a further embodiment, the method includes acts of determining a time-of-launch based at least in part on a first step-change in an output signal of the accelerometer; and determining a time-of-impact based at least in part on a second step-change in an output of the accelerometer. In some embodiments, the method includes an act of determining a total time of flight of the arrow, wherein the total time of flight includes the free flight and at least one of a launch-phase and an impact-phase.

In another aspect, a method of analyzing flight-data for an arrow shot from a bow includes collecting flight-data during at least one flight of the arrow; and performing frequency analysis on the collected flight-data. Further, in one embodiment, the act of collecting includes an act of sampling the flight-data in a time-domain, the act of performing frequency analysis includes an act of measuring the collected flight-data in the frequency domain and the act of measuring includes an act of applying a Fast Fourier Transform to the collected flight-data. In one embodiment, the act of performing frequency analysis includes an act of determining frequency peaks in the collected flight-data.

According to another aspect, a method of analyzing flight-data for an arrow shot from a bow includes collecting acceleration-sensor output data during at least one flight of the arrow; and comparing information provided by the acceleration-sensor output data to at least one predetermined threshold. In one embodiment, the predetermined threshold includes at least one of a minimum acceleration and a maximum acceleration. In another embodiment, the predetermined threshold includes an average acceleration.

In one embodiment, the method includes providing a shot-placement of the arrow on a target for use in analyzing the flight-data. The method can also include analyzing flight-data for the arrow for a plurality of shots. In a further embodiment, the method includes taking at least some of the plurality of shots from a common distance. According to one version all of the plurality of shots are taken from a common distance.

According to another embodiment, the method includes analyzing flight data for a plurality of different arrow configurations. In one version, the plurality of different arrow configurations include a plurality of different arrows.

According to one aspect, a system for communicating arrow flight-data includes a USB drive configured to connect to an arrow-mounted electronic device and store flight-data communicated from the arrow-mounted electronic device. In one embodiment, the system includes a user interface including a display in the USB drive. In a further embodiment, the USB drive includes a memory, and the user interface is configured to allow a user to review information concerning flight-data stored in the memory.

According to another aspect, an arrow flight-data system, includes a base station, and an arrow-mounted electronic device including a single-wire communication interface configured to transmit flight-data. In one embodiment, the single-wire communication interface is configured to communicate acceleration data collected during at least one flight of the arrow.

According to another aspect a method of evaluating a stability of an arrow in-flight includes; employing data generated by an accelerometer included in the arrow during free-flight of the arrow to detect the stability of the arrow during at least a portion of a flight of the arrow. According to another embodiment, the method also includes an act of including at least one vibration dampener in the arrow. In one version, the at least one vibration dampener is included in at least one of an insert and a nock of the arrow. Further, a first vibration dampener can be included in the insert; and a second vibration dampener can be included in the nock. In one embodiment, the method includes an act of evaluating an output of the accelerometer to determine whether sufficient vibration dampening is provided by the at least one vibration dampener.

According to a further aspect, a method of evaluating a vibration level in archery equipment including a bow and an arrow, includes including one or more vibration dampeners in the archery equipment; and determining a vibration level found in the arrow during a free-flight after being loosed from the bow, the vibration level determined at least in part from data provided by a sensor included in the arrow. According to one embodiment, the method includes an act of determining a magnitude of a radial acceleration relative to a longitudinal axis of the arrow. In a version of the preceding, the accelerometer is a multi-axis accelerometer, and the method includes an act of determining the radial acceleration in each of a first radial direction and a second radial direction relative to the longitudinal axis. According to a further embodiment, the method includes an act of adjusting at least one of a size, a shape and a mass of a vibration dampener included within a shaft of the arrow based at least in part on the vibration level determined in the act of determining.

BRIEF DESCRIPTION OF DRAWINGS

The accompanying drawings, are not intended to be drawn to scale. For purposes of clarity, not every component may be labeled in every drawing. In the drawings:

FIG. 14 illustrates a display in accordance with one embodiment; and

DETAILED DESCRIPTION

Figure 1:
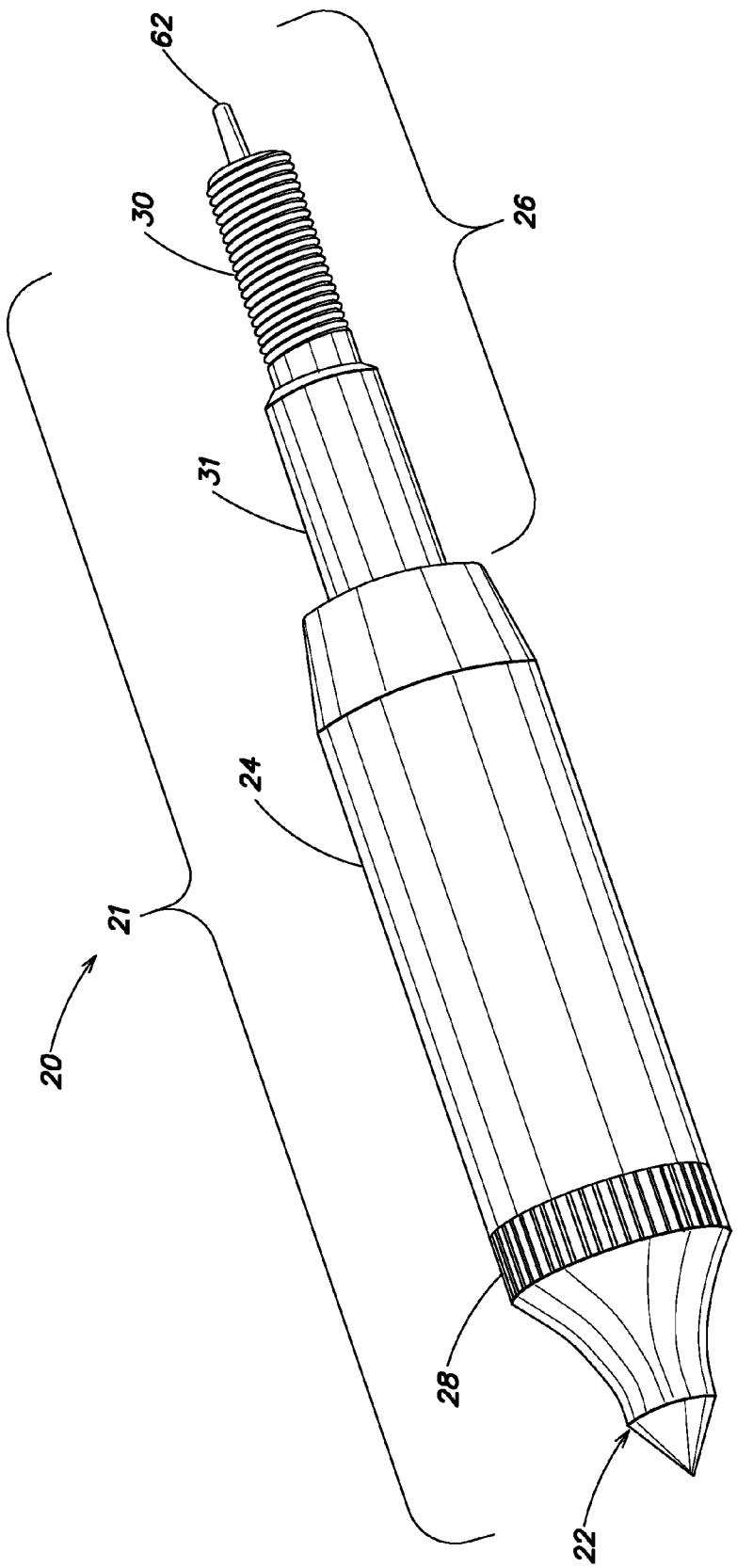
FIG. 1 illustrates an arrowtip in accordance with one embodiment.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

As used herein, the term "flight" when used in embodiments concerning archery, is employed to generally describe any period from the point in time when an archer releases their grip (whether fingers or a grip provided by a mechanical release aid) on the bow string until the point in time when the arrow-penetration of the material struck by the arrow ends. Accordingly, except where otherwise indicated, the term flight refers to periods in time including: 1) a launch-phase during which the arrow is attached to (for example, at the nock) and is propelled forward by the bow string; 2) a free-flight phase during which the arrow travels from the bow downrange to a point of impact; and 3) an impact-phase which begins with initial target impact and ends when the arrow's forward motion ceases.

As used herein, the term "flight-data" refers to data generated by one or more of the plurality of sensors 122 and/or microcontroller/processor, included in the electronic apparatus 18, concerning the arrow's flight. According to further embodiments, the term flight-data refers to data that is generated at any point of flight including launch and impact, or alternatively, only generated during free-flight. Consequently in the later embodiment, the flight-data may not include either or both of data generated during the launch-phase and data generated during the impact-phase.

The term "arrow-mounted" as used herein refers to a device or a portion thereof that is included in an arrow when the arrow is loosed from a bow. The term "arrow-mounted" may be employed to describe any of: a device that is permanently included in the arrow, semi-permanently included in the arrow or temporarily included in the arrow. An arrow-mounted device can be included entirely in an interior region of the arrow (for example, within a hollow region of the arrow shaft), entirely external to the arrow (for example, alongside or extending from the exterior of the arrow-shaft, or include a first portion that is external to the arrow and a second portion that is internal to the arrow. Further an arrow-mounted device can be included in all or a portion of an arrow accessory such as an arrow nock or arrow point.

Referring to FIG. 1, an arrowtip 20 is illustrated in accordance with one embodiment. The arrowtip includes a cap 22, a body 24, and a shaft 26 that in accordance with one embodiment provide a housing 21 for an electronic apparatus. The illustrated embodiment includes a grip 28 (for example, a knurled region) which is included in the cap 22. According to another embodiment a grip is included in the body 24 either alone or in combination with the grip 28. In addition, the housing 21 includes a threaded region 30 of the shaft 26. In accordance with some embodiments, the housing 21 attaches to the distal end of an arrow by threading the arrow to an insert.

Figure 2:
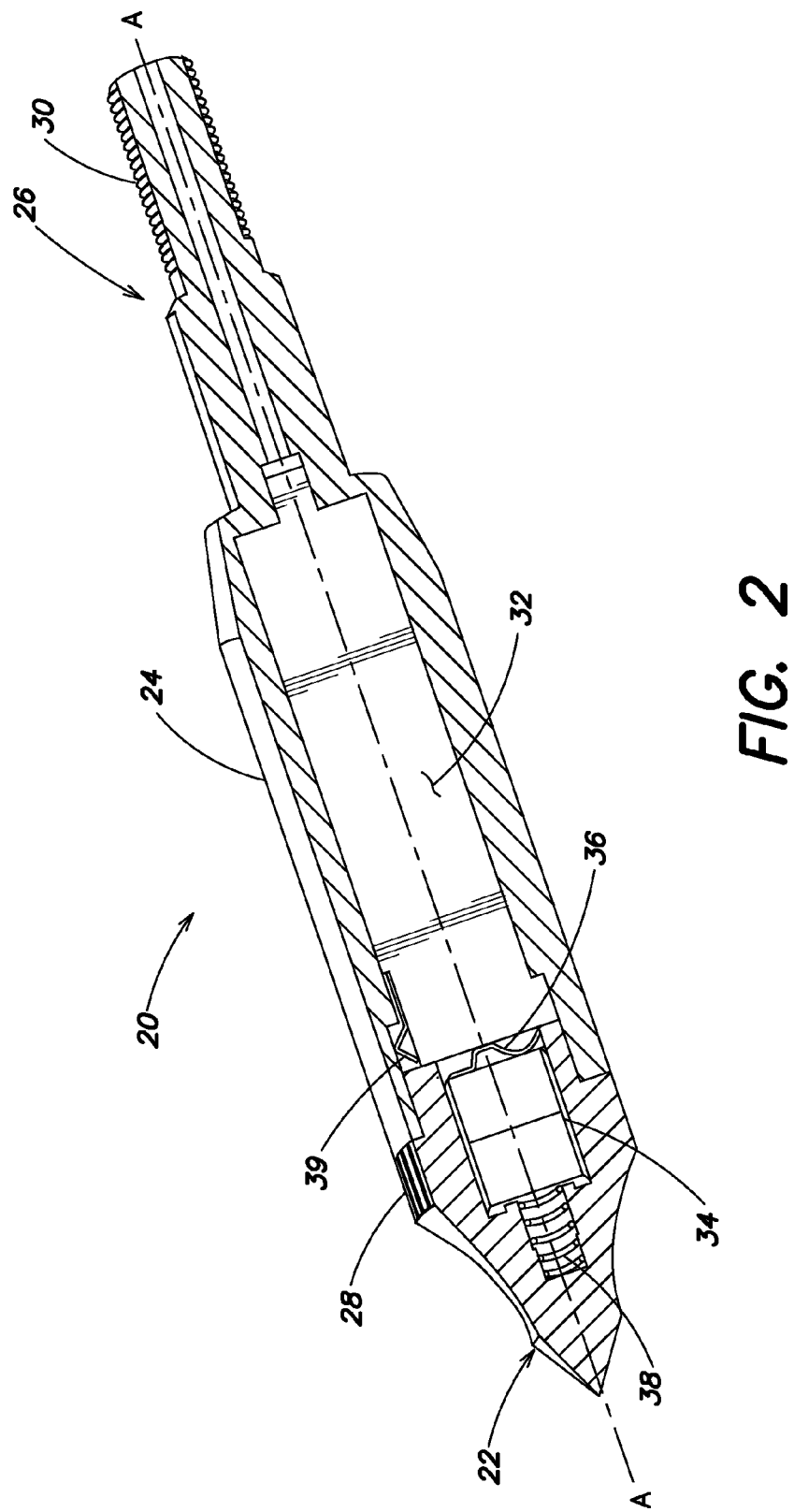
FIG. 2 illustrates a longitudinal sectional view of an arrowtip in accordance with a further embodiment.

Referring now to FIG. 2, a cross-sectional view is illustrated in accordance with one embodiment of the arrowtip 20. According to the illustrated embodiment, a printed circuit board 32 and a power source 34 are located in an interior of the housing 21. In the illustrated embodiment, the arrowtip 20 includes a cavity in the body where the printed circuit board 32 is located. The arrowtip 20 also includes a first spring contact 36, a second spring contact 38 and a third spring contact 39. In accordance with one embodiment, the first spring contact 36 is located at the distal end of the printed circuit board 32 and provides an electrical contact to connect the power source 34 to the printed circuit board 32. In one embodiment, the second spring contact 38 provides an electrical contact to connect the power source to a conductive portion of the housing 21, for example, the cap 22. In accordance with a further embodiment, the second spring contact 38 is a helical spring. In accordance with still another embodiment, the third spring contact 39 provides an electrical contact to connect the printed circuit board 32 to a conductive portion of the housing 21, for example, the body 24. In accordance with some of the preceding embodiments, a complete connection between multiple poles of the power source 34 and the printed circuit board 32 are provided by a plurality of spring contacts, for example, the spring contacts 36, 38, 39.

Figure 3:
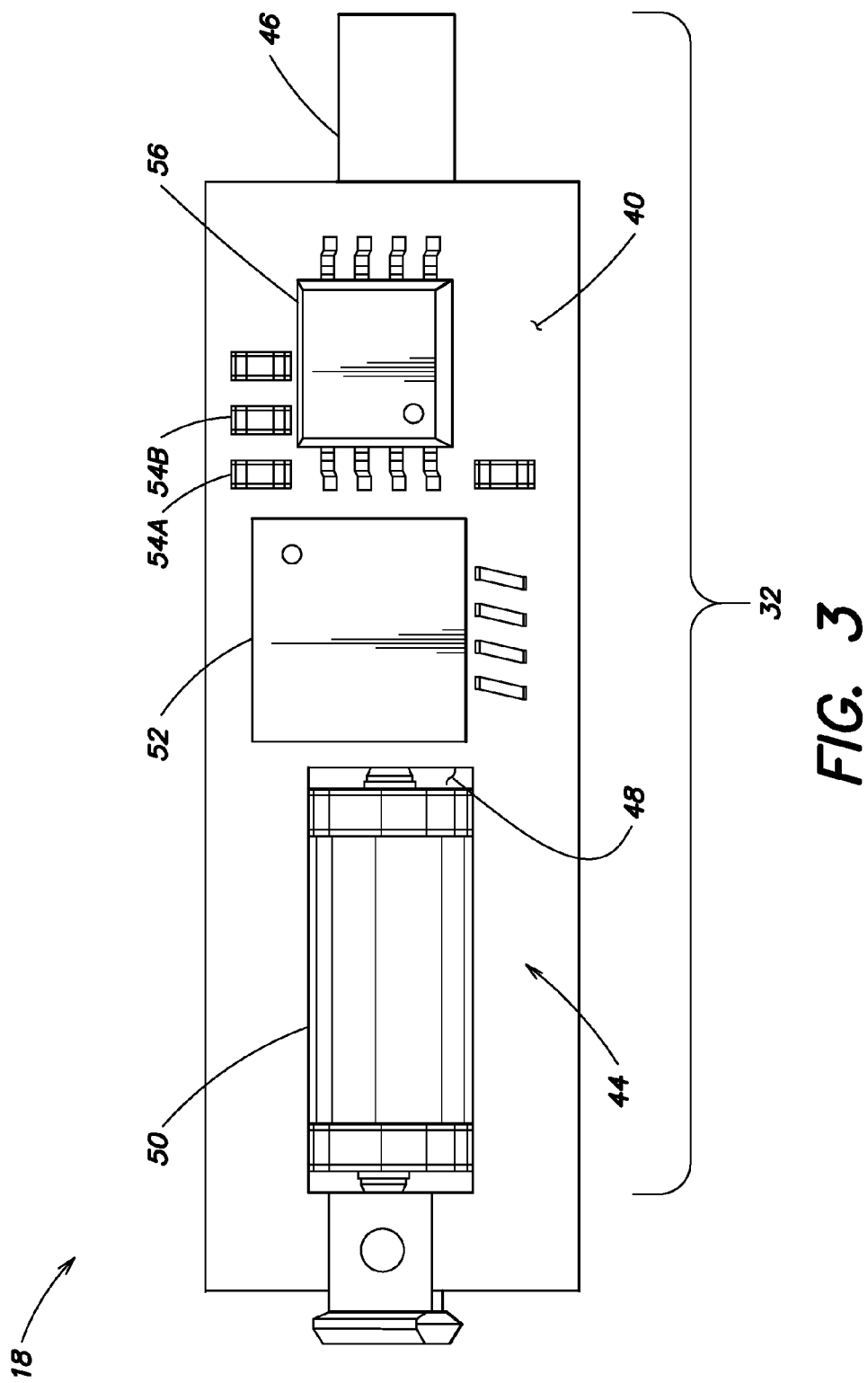
FIG. 3 illustrates a first side of a printed circuit board in accordance with one embodiment.

Referring now to FIG. 3, the printed circuit board 32 is illustrated where it includes components. In accordance with one embodiment, the printed circuit board includes a first planar side 40 (FIG. 3) and a second planar side 42 illustrated in FIG. 4. Further, in accordance with one embodiment, the printed circuit board is a multi-layer circuit board, for example, a four layer circuit board wherein an insulating layer separates each conductive layer. In a further embodiment, the material of the printed circuit board includes conductive layers set on FR4. According to one embodiment, the total thickness of the printed circuit board is between 0.7 to 0.9 mm.

According to the illustrated embodiment, the printed circuit board includes a main region 44 where both active and passive components are surface mounted and an extension 46. Further, in some embodiments, the printed circuit board includes a cavity 48.

As illustrated in FIG. 3, the components mounted on the printed circuit board 32 include a shock sensor 50, a microcontroller 52, a plurality of passive components 54 and memory 56. In accordance with various embodiments, the passive components include any of resistors, capacitors and inductors, either alone or in combination with one another or with one or more active components.

In accordance with some embodiments, the location of the components on the PCB (for example, location of any of the sensors) is selected to reduce an amount of vibration transmitted to them, by for example, flection of the printed circuit board created by the shock transmitted to the arrow at launch. Thus, where one or more edges of the printed circuit board are engaged with a slot provided by the arrowtip housing 21, the engagement provides greater stability/rigidity at an edge of the printed circuit board. Consequently, one or more the sensors are mounted radially outward relative to the central longitudinal axis of the printed circuit board.

According to some embodiments, the electronic apparatus is epoxied (sometime referred to as potted) within the housing 21 to provide improved stability of the printed circuit board. For example, the printed circuit board 32 and associated electronic components are epoxied in the main cavity in accordance with one embodiment. According to these embodiments, the magnitude of vibration sensed by the sensors is decreased because the deflection of the printed circuit board is substantially eliminated. The preceding approach can improve the accuracy and hence utility of the output provided by the sensors, for example, the accelerometers or other inertial sensors because it substantially eliminates vibration that is related to the construction and mounting of the electronic apparatus and/or housing. According to one embodiment, the epoxy includes a two component epoxy, for example, MAGNOBOND 3266A/B.

According to one embodiment, the microcontroller is loaded with embedded software such that the microcontroller controls an operation of the electronic apparatus and performs operations to allow a collection of flight-data (for example, acceleration data and/or event timing data, etc.) during a flight of an arrow in which the electronic apparatus 18 is installed. According to one embodiment, the microcontroller is a model ATtiny 24/44/84 manufactured by Atmel Corporation, while in another embodiment the microcontroller is a model PIC16F677/687/689 manufactured by Microchip. In alternate embodiments, other microcontrollers may be employed provided that the functionality and small form factor that may be required of the application in which they are employed.

According to various embodiments, the microcontrollers can include one or a combination of integral memory including any one of or any combination of flash memory, internal EEPROM, and internal RAM. A package-type of the microcontroller can vary depending upon the microcontroller selected, however, according to one embodiment the microcontroller package is a type QFN20. In addition, in some embodiments, a low power consumption microcontroller can be employed, for example, a microcontroller that draws 300 microamps or less when in an active mode and 0.1 microamps or less when in sleep mode. Further, where an internal EEPROM or an internal RAM are included in this microcontroller, the memory size may be anywhere from 128 to 512 bytes.

According to various embodiments, the microcontroller performs one or more of the following tasks alone, in combination with one another or in combination with any of the following and other tasks: detection of wake-up event (interrupt); performing total flight time T measurement via timers and/or counters included in the microcontroller; communication with a base station such as a docking station, USB drive and/or PC; write/read data to/from internal/external Eeprom; reading data from the sensors/AD converter, setting up the sensor/AD converter; providing space for the program/embedded software to implement a control algorithm and bus communication protocols; providing RAM capacity to accommodate variables and an Eeprom page data stack.

For example, according to one embodiment, the microcontroller is responsible for wake-up event detection. In this embodiment, the microcontroller will be in sleep (low power) mode when not in use to reduce power consumption during periods of inactivity, for example, to reduce power consumption as low as 0.1 uA. The interrupt for this mode can include a change of a value provided to a selected certain microcontroller pin. The change of the value could be generated, for example, by any one of or any combination of a magnetic reed switch, a shock switch, connection to the base station. According to a further embodiment, the microcontroller can detect inactivity and then return to sleep mode following a specified period of time of inactivity.

According to one embodiment, the microcontroller is responsible for a measurement of the time-of-flight of the arrow. According to one embodiment, the accuracy of the time-of-flight measurement is at least 100 μs. In another embodiment, the accuracy of the time-of flight measurement is 300 us or better to allow the calculated values of the flight-speed of the arrow to provide a 99% or higher accuracy (i.e., have an error of 1% or less).

As mentioned above, an interrupt driven timer/counter can be employed to measure the time-of-flight. According to one embodiment, the maximum time of flight is 2 seconds (2000 ms). According to this embodiment, a 16 bit timer/counter is employed to provide a resolution of the time measurement greater than or equal to 100 μs. According to an alternate embodiment, the preceding result can be achieved by use of an 8 bit Hardware Timer/Counter together with an 8 bit software counter. According to one embodiment, a timer clock frequency is at least 10 kHz to provide a period of 100 μs.

According to a further embodiment, the microcontroller communicates with the base station, for example: to transmit stored data from the arrowtip to the base station; to erase data stored in memory; and/or to set up parameters for the arrowtip (for example, measurement parameters). Communication could also be used to wake up the microcontroller from sleep mode. In a further embodiment, the communication can be used to provide a firmware upgrade to the arrowtip. Depending upon the embodiment, the external communication bus (arrowtip to base station) can be selected from a plurality of communication buses, for example, serial communication buses such as a 2 wire I2C bus, a 1-wire bus, an SPI bus, USB, RS232 and the like.

According to still another embodiment, the microcontroller controls either or both of data-read and data-write operations. According to some embodiments, the flight-data is stored in a memory internal to the microcontroller 52 and/or in memory 56 which is external to the microcontroller. In one embodiment, where the electronic apparatus is used to store data concerning the time-of-flight the time-of-flight data can be stored as a timer/counter 16 bit value. Thus, where the electronic apparatus 18 stores flight-data for 20 shots the memory capacity is:

$$20\ shots \times (Time\ T(16\ bits) + Add\_Info(16\ bits)) = 640\ bits = 80\ bytes$$

According to a further embodiment, data-read and/or data-write operations are performed on a page-read and page-write basis, respectively. Accordingly, given a page buffer size of the memory 56, the microcontroller 52 employs an internal page buffer in RAM memory with the same size.

In accordance with one embodiment, the memory 56 includes EEPROM memory external from the microcontroller 52. According to one embodiment, the memory can include a types AT24C32/64/128/256/512 EEPROM manufactured by Atmel. While in another embodiment, the memory 56 includes any of types 24AA32A/64A/128A/256A/512A manufactured by Microchip. In various other embodiments, different EEPROM memory may be employed provided includes the functionality and storage capacity for the selected application. According to one embodiment, the electronic device 18 employs an I²C communication protocol. In accordance with further embodiments, the memory 56 is included in a small form factor or miniature package such as a ULA2×1.8×0.4 mm size (while in another embodiment, the package is a DFN2×3×0.75 mm)/MSOP. Further features may include low power consumption, for example, anywhere from between 0.4 to 2 milliamps when the memory is in an active state, 1 microamp when in sleep mode and 5 milliamps or less when in write mode. In addition, in some embodiments, a short write cycle duration is advantageous due to the sampling speed and the amount of data that is collected. For example, in one embodiment, the write cycle duration is 5 milliseconds or less.

According to one embodiment, a minimum size of memory 56 is determined as follows, assuming a maximum flight time of 2000 ms. Where for example, the electronic apparatus includes sensors with sample rate of 400 Hz, 3-axes accelerometers (with data for the longitudinal axis acquired), 3-axes magnetometer (with data for at least 2 axes acquired), 12 bit acceleration and magnetic data, 20 shot memory, the minimum memory size can be determined as follows:

$$Capacity = T_{max} \cdot f_{sample} \cdot 3_{axes} \cdot 12_{bit} \cdot 20_{shot} = 576\ kbit$$

According to this example, the size of the memory 56 is at least 576 kbit where the arrowtip is employed for long flights and the sensors have relatively high sample rate. Further, the preceding provides just one example where the same approach can be employed to determine a minimum memory size for a different set of conditions that can be created, for example, when sensors having different sample rates are employed, and/or different data lengths (16 bit) are used, etc. Thus, the minimum memory size can be less than or greater than that determined above for different embodiments. Accordingly, in some embodiments, the size of the memory 56 is selected from any of 128/256/512/1024 kb.

According to one embodiment the memory 56 includes the following features: a capacity of 128/256/512/1024 kb; a serial communication interface such as SPI or IIC (CLK 400 kHz); capable of being employed in page write/read operations; power down feature and/or low standby power consumption; low power consumption during write and read cycles (for example, power consumption of 1-5 mA); operational with a supply voltage in a range of 2.7-3.6V; page write time of a maximum of 5 ms; maximum package dimensions of 2×5×5 mm (DFN, MSOP, SOT23).

According to further embodiments, the memory 56 is provided by a form of memory other than EEPROM, for example, Flash memory, SONOS memory or other types of non-volatile memory.

According to some embodiments, the shock sensor 50 includes an acceleration sensitive switch such as an SQ-ASx series shock sensor that opens or closes depending upon the model when accelerated past a predetermined acceleration threshold. The SQ-ASx series shock sensors are manufactured by SIGNALQUEST. Other shock sensitive devices can also be employed instead of or in combination with the shock sensor 50. According to one embodiment, the electronic apparatus 18 includes 2 shock sensors where a first shock sensor is oriented in a first direction and a second shock sensor is oriented in a second direction which is parallel to but the reverse relative to the first shock sensor. In one embodiment, the immediately preceding configuration is advantageous where the shock sensor 50 is unidirectional. According to this embodiment, the first shock sensor senses launch of the arrow while a second sensor senses impact. In a further embodiment, the shock sensor is an omni-directional shock sensor that is sensitive to acceleration in at least two directions. In accordance with various embodiments, the shock sensor may have a predetermined acceleration value at which it activates, for example, according to one embodiment, the shock sensor is selected to activate at any one of a preselected g force depending upon the application. For example, the g force can range from 150 g to 350 g in one embodiment. The activation value can vary depending upon the embodiment, and can for example, be set to more precisely capture the timing of events such as the start of the launch-phase, the start of the free-flight phase and/or the start of the impact-phase.

Figure 4:
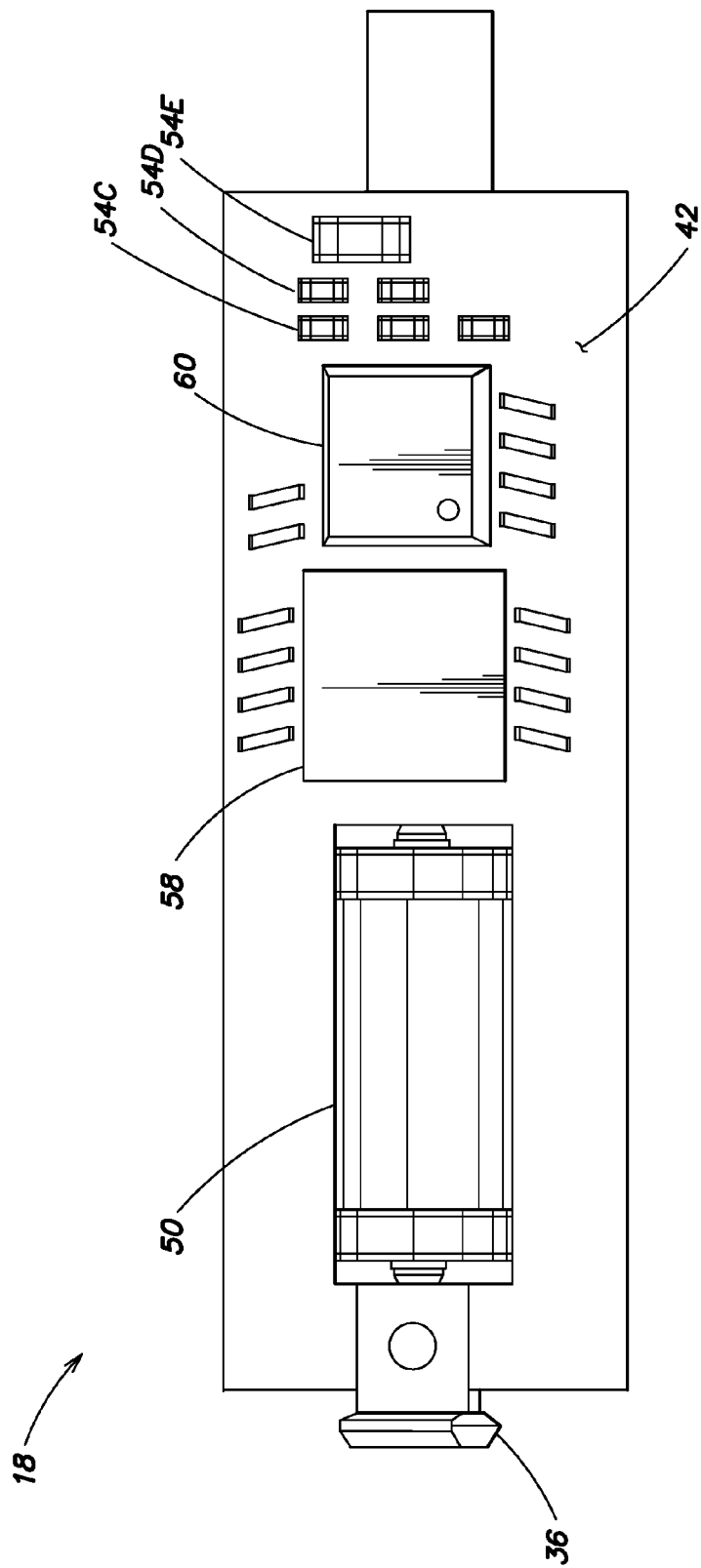
FIG. 4 illustrates a second side of the printed circuit board of FIG. 3 in accordance with one embodiment.

Referring now to FIG. 4, the electronic apparatus 18 and printed circuit board 32 are illustrated. In the illustrated embodiment, the shock sensor 50 is viewed from a side opposite that illustrated in FIG. 3 while additional passive components 54C, 54D, 54E are located on the printed circuit 32. In addition, the electronic apparatus 18 includes a first sensor 58 and a second sensor 60. Further, in some embodiments three or more sensors are included in the electronic apparatus 18 such that any one or any combination of the sensors described below can be employed in the apparatus 18 depending upon the embodiment. So, for example, each of a magnetometer, a high-g sensor and a multi-axis accelerometer are included in the electronic apparatus 18.

In accordance with various embodiments, the first sensor 58 may include any of, a single axis high-g accelerometer, magnetometer, or other sensors alone or in combination with one another or with other types of sensors.

According to one embodiment, where the first sensor 58 includes a magnetometer, a 3-axis magnetometer can be used to estimate the roll of the arrow during the flight and the yaw of the arrow immediately prior to launch. According to one embodiment the magnetometer includes one or more of the following features: employ a triaxial sensor (for example, a MI, GMI or AMR type); a minimum range of ±1 gauss; a minimum resolution of 10-12 bits; includes a digital interface such as SPI or IIC (for example, a serial interface); alternatively, an analog interface can be employed; includes a power down feature; includes low power consumption; operable with a supply voltage of 2.7-3.6V; and including a maximum package dimensions of 2×5×5 mm.

In accordance with one embodiment, where a magnetometer is used the arrowtip 20 is manufactured from a non-magnetic material (for example, non-ferrous) such as aluminium, duralumin, plastic or ceramic.

According to one embodiment, where the first sensor 58 includes a high-g accelerometer the high-g accelerometer is employed to provide acceleration data during either or both of the launch-phase and the impact-phase of the arrow's flight. For example, a high-g accelerometer can be included in an electronic apparatus which is located at the proximate end of the arrow (for example, as part of the nock) and used with different types of arrowtips (for example, different makes and models of broadheads, fixed blade, compact, mechanical etc.) to determine any of the velocity, kinetic energy and/or momentum maintained by the arrow after target-impact (i.e., during target-penetration). According to one embodiment the high-g accelerometer includes one or more of the following features: a single axis, for example, co-located at a longitudinal axis of the arrow; a range of ±1200 g (for example, launch measurement) or higher 5000 g (for launch and impact measurement); a minimum resolution of 12 bits; an output data rate of greater than 40 kHz; a digital interface such as SPI or IIC (for example, a serial interface); alternatively an analog interface can be employed; a power down feature; low power consumption; operable with a supply voltage of 2.7-3.6 V; an interrupt when the device threshold is exceeded; a high bandwidth and sample rate; and a maximum package dimension of 2×5×5 mm.

In accordance with one embodiment, the second sensor 60 includes a multi-axis accelerometer. According to one embodiment, the second sensor 60 includes a three axis accelerometer that includes a g range of 2 g or less. According to one embodiment, the range of the first sensor is 2 g while in another embodiment, the range is 4 g, in a further embodiment the range is 8 g and in still another embodiment the range is 16 g. According to some embodiments, the second sensor 60 includes a multi-axis accelerometer with a plurality of ranges that may range anywhere from 2 to 32 g, for example. In accordance with one embodiment, the second sensor is a type ADXL345 three-axis accelerometer manufactured by Analog Devices, while in another embodiment, the second sensor 60 is a type ADXL346 manufactured by Analog Devices, and in still another embodiment, the second sensor includes a type LIS331DL three-axis accelerometer manufactured by ST Microelectronics.

Other types of second sensors 60 (or combinations of sensors) may be employed in various embodiments including single-axis accelerometers, accelerometers with two or more axes, and/or a gyroscope. Various features may be included in the second sensor including a communication protocol/digital output that is consistent with the communication protocol employed by the electronic device, for example, I²C. Further, either the first sensor 58 or the second sensor 60 may be selected based on their resolution, their package size, their power consumption, and their weight. In accordance with one embodiment, either or both of the first sensor 58 and the second sensor 60 have a resolution of 10 to 13 bits, a package size of type LGA14 or LGA16, and are switchable between various g ranges, for example, two or more of 2 g, 4 g, 8 g and 16 g.

According to one embodiment, the highest available range (for example, 16 g) of the accelerometer is employed to capture the full range of acceleration detected by the accelerometer. Further, where acceleration ranges are expressed in the accelerometer specifications above, they may include acceleration in two directions where a first direction is identified as a positive value of acceleration and the opposite direction is identified as a negative acceleration. Accordingly, the acceleration ranges can also show the bi-directional nature of the sensing, for example, ±2 g, ±4 g, ±8 g and ±16 g. Where such a convention is used acceleration in the negative direction can be referred to as deceleration. According to a further embodiment, the accelerometer provides a resolution of 4 mg/least significant bit. In other embodiments, the resolution is better than 4 mg/LSB.

According to one embodiment, the second sensor 60 can be used to provide data concerning an initial arrow pitch and roll angle $\theta_{ini}$ before the arrow is launched. In a further embodiment, arrow acceleration in the longitudinal direction will be acquired in flight. In still another embodiment, and referring to the longitudinal axis as the x-axis, acceleration data for each of the y and z axes is also acquired in flight, that is, radial acceleration in a first axis and radial acceleration in a second axis. In yet another embodiment, the time-of-flight is estimated from the acceleration data. According to this embodiment, the start of the flight can be established based on an occurrence of a first acceleration peak and the flight terminus can be established based on a second acceleration peak. Further, in some embodiments, the preceding approach is employed even where the accelerometer output is saturated during launch and impact due to its low g range relative to the force of launch or impact because the exact acceleration value need not be used for calculations.

According to various embodiments, the total time-of-flight is estimated to be between 50 ms and 2000 ms, for example, where the distance between the archer and the target is anywhere from approximately 5 yards to 90 yards. Thus, in one embodiment, the accelerometer sample data rate is a minimum of 400 Hz to provide a minimum of 20 samples of acceleration data for a set of conditions where the minimum flight time of 50 ms occurs (for example, where the electronic apparatus is included in an arrow where a fast bow/arrow combination is used at a short flight distance). For a given time of flight and quantity of samples the sample frequency can be found according to the following:

$$T_{sample} = T_{min}/N_{sample} = 50/20 = 2.5 \text{ ms}, f_{sample} = 1/T_{sample} = 400 \text{ Hz}$$

According to one embodiment the sample rate is established such that the data output rate is a minimum of 3.3 kHz to record launch and/or impact events within 300 µs. The preceding approach can also support embodiments in which the flight-data acquired by the electronic apparatus can be employed to generate estimates of arrow speed at an accuracy of ±1%.

According to one embodiment the second sensor 60 includes an accelerometer having one or more of the following features: 3 axes; a range of ±2 g; a minimum resolution of 12 bits; a digital interface such as SPI or IIC (for example, a serial interface); alternatively an analog interface can be employed; an minimum output data rate of at least 400 Hz/3.3 kHz; a power down feature; low power consumption; operable with a supply voltage of 2.7-3.6 V; interrupt generation where the device threshold is exceeded; and maximum package dimensions of 2×5×5 mm.

According to one embodiment, either or both of the first sensor 58 or the second sensor 60 includes an accelerometer with an internal FIFO that provides a data buffer for the acceleration data generated by the accelerometer. In a further embodiment, the accelerometer includes one or more interrupts that can be employed to generate flight data which can be processed to determine one or more flight characteristics of the flight of the arrow. For example, the accelerometer can include: a first interrupt that provides an output signal when the accelerometer senses free fall; a second interrupt that provides an output signal when the accelerometer goes into an active state; and a third interrupt that provides a signal when the accelerometer transitions from an active state to an inactive state.

As mentioned above, low power consumption may also be advantageous and the first sensor 58 and/or second sensor 60 may have power consumption that is 250 microamps or less when in an active mode, 25 microamps or less when in a sleep mode, and 2 microamps or less when in a deep sleep mode. In accordance with one embodiment, the power consumption of the accelerometer is 130 microamps or less when in an active state, 25 microamps or less when in a sleep mode, and 0.1 to 2 microamps when in deep sleep mode.

In some embodiments, it is advantageous to employ both the shock sensor and the accelerometer in combination. According to one embodiment, the shock sensor has a more rapid response time than the accelerometer and can be employed to rapidly detect events such as launch and impact while the accelerometer is used to provide acceleration data during free-flight. For example, the shock sensor can operate as quickly as 100 microseconds or less to detect an acceleration event.

According to some embodiments, the shock sensor is employed to activate the electronic apparatus 18 for flight-data acquisition. In accordance with one embodiment, the electronic apparatus 18 is activated from the sleep mode when the shock sensor responds to a sudden acceleration of the arrow. In some embodiments, either alone or in combination with the preceding features, a sudden change in an output of the accelerometer in a first direction signals a start of free flight and a sudden change in the output of the accelerometer in a second direction signals target-impact (for example, the start of the impact phase). In accordance with one embodiment, the sudden changes in accelerometer output are "step-like" changes in the output signal. In one embodiment, the step like change of the accelerometer sensing acceleration along the longitudinal axis of the arrow is employed to detect launch and impact. According to a further embodiment, time-of-flight is determined as an average of the time-of-flight determined from the accelerometer output and the time-of-flight determined from the output of the shock sensor, for example, where the time-of-flight is a time of free-flight.

In accordance with one embodiment, the active and the passive components included in the electronic apparatus 18 are surface mounted on the printed circuit board 32, for example, on each of the first planar surface 40 and the second planar surface 42. Referring to FIG. 4, the first spring contact 36 is also illustrated in accordance with one embodiment. In the embodiment illustrated, the first spring contact 36 includes a flat sheet metal type spring that is surface mounted on the printed circuit board 32. As described above, the first spring contact 36 can be employed to provide a contact for a power source included in the electronic apparatus 18, such as a battery power source. Although described as a spring contact, the first spring contact 36 may or may not be resilient such that it will deflect when the electronic apparatus 18 is integrated in the arrow. Instead, in other embodiments, the first spring contact 36 may be replaced with a contact that may or may not include a resilient or spring member.

Figure 12:
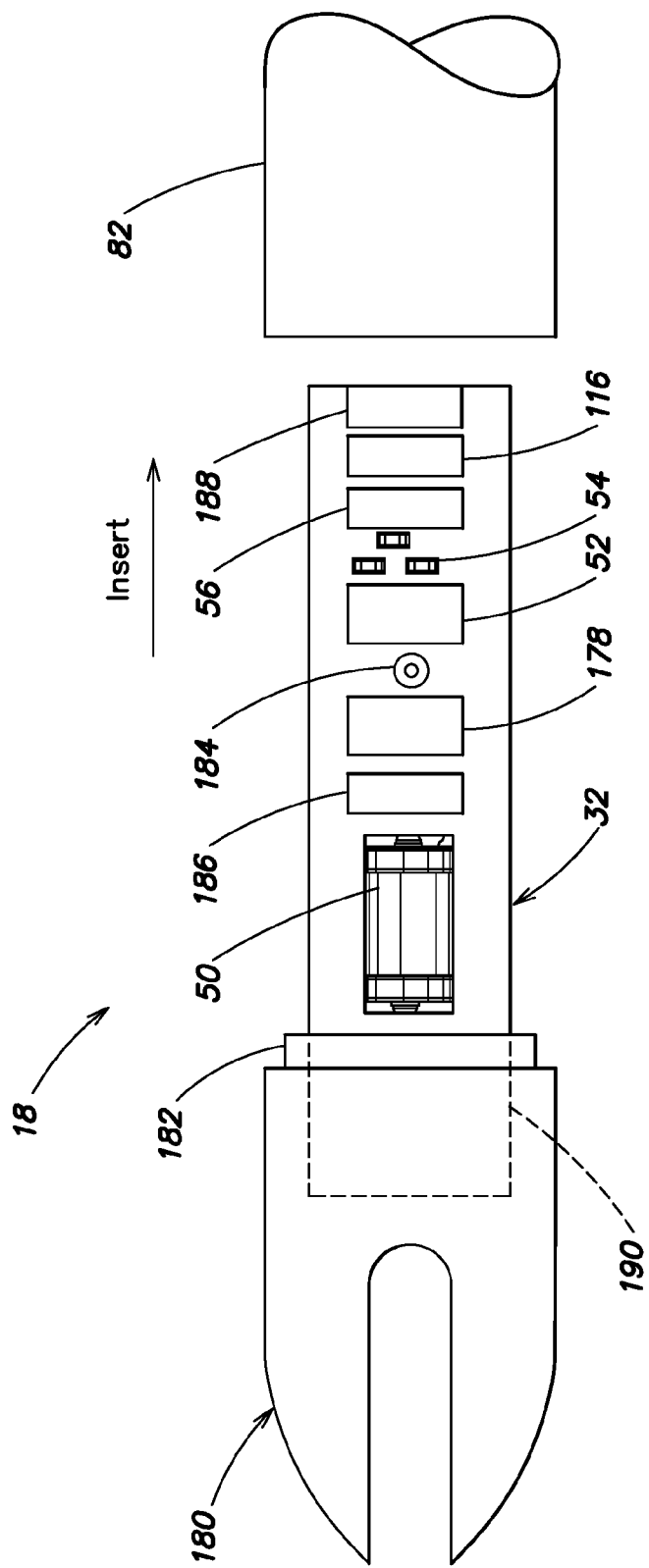
FIG. 12 illustrates an electronic apparatus in accordance with yet another embodiment.

Further, although illustrated as included in an arrowtip in FIGS. 1 and 2 in various other embodiments, the electronic apparatus 18 may be included elsewhere in the arrow, for example, as part of a nock of the arrow. Accordingly, the features and functionality described above and that follow are not limited to an electronic apparatus 18 which is housed in an arrowtip and instead are also applicable to other embodiments that may be located elsewhere within the arrow, for example within a hollow shaft of the arrow and/or in or at the nock of the arrow. In accordance with a further embodiment, the electronic apparatus 18 is integral to a nock 180 as illustrated in FIG. 12. As used herein in reference to the embodiment illustrated in FIG. 12, the term "integral" refers to the fact that the electronic apparatus 18 is installed and removed from the arrow when the nock 180 is installed and removed from the shaft 82 of the arrow, respectively. Thus, in these embodiments, the attachment or inclusion of the electronic apparatus 18 integral to the nock need not be permanent.

In general, the electronic apparatus 18 operates to generate flight-data for flights of an arrow in which it is included, for example, as described in greater detail elsewhere herein. According to one embodiment, the electronic apparatus 18 illustrated in FIG. 12 includes the shock sensor 50, the microcontroller 52, passive components 54, the memory 56, the power source 116, an accelerometer 178, a communication activation device 184, a wireless communication interface 186 and a hardwire communication interface 188. According to one embodiment, at least some of the preceding elements are included on the printed circuit board 32 that includes a region 190 which can be included in a body portion of the nock 180. In various embodiments, the electronic apparatus can include different combinations of the preceding elements or different ones of the preceding elements in combination with other elements included in the electronic apparatus 18. For example, the accelerometer can include any of a single axis accelerometer, a multi-axis accelerometer, a "low-g" accelerometer, a "high-g" accelerometer. The electronic apparatus can also include a magnetometer, a gyroscope or other sensors (including other types of inertial sensors) employed to generate flight-data.

In general, the electronic apparatus 18 illustrated in FIG. 12 is included in an arrow by sliding the nock within a hollow cylindrical center of the shaft 82 in the direction identified as "Insert" in FIG. 12. The nock can be held in place with an adhesive, however, in another embodiment the nock 180 is retained within the arrow shaft 82 via a friction-fit. In one embodiment, a diameter of a region 182 of the nock 180 is sized for a friction fit within the shaft 82. According to this embodiment, the electronic apparatus 18 can be removed from the arrow by withdrawing the nock in a direction opposite the insert-direction.

In various embodiments, the electronic apparatus includes: each of the wireless communication interface 186 and the hardwire communication interface 188; the wireless communication interface 186 but not the hardwire communication interface 188; the hardwire communication interface 186 but not the wireless communication interface 188; or neither communication interface 186, 188. Where the hardwire communication interface 188 is included, it can include structure that provides contacts for electrical connection to an external device such as a base station (for example, a docking station). This structure can, for example, include male contacts or pins, female contacts or pins, or other electrical connections, known in the art. Further, in some embodiments, it can be desirable to provide a common type of structure for connecting an arrowtip-type electronic apparatus and a nock-type electronic apparatus to the same base station. Thus, according to one embodiment, the hardwire communication interface 188 includes a threaded electrical connection. In other embodiments, one or a plurality of spring biased contacts are included in the base station and are configured to provide a resilient contact with a corresponding contact surface included in the electronic apparatus 18.

According to some embodiments, the communication activation device 184 is employed with either or both of the wireless communication interface 186 and the hardwire communication interface 188. In some embodiments, the communication activation device 184 can be employed after removal of the electronic apparatus 18 from the arrow. For example, once the electronic apparatus 18 is removed from the arrow the communication activation device 184 can be employed to initiate the communication of flight-data from electronic apparatus 18 to the base station. According to one embodiment, the communication is performed wirelessly by RF communication. According to this embodiment, the wireless communication interface 186 includes an RF transmitter. In another embodiment, the wireless communication interface 186 includes a wireless transceiver that can both transmit and receive data via RF communication. According to this embodiment and one or more embodiments including the hardwire communication interface 188, the electronic apparatus 18 receives data, instructions and/or commands from the base station, for example, the embedded software for the microcontroller 52. Other programming (for example, where programmable sensors are employed) can be accomplished via either or both of the wireless communication interface 186 and the hardwire communication interface 188.

The activation device 184 can include a variety of structure depending upon the embodiment. According to one embodiment, the activation device 184 includes a switch, for example, a pushbutton switch that allows a user to initiate a communication of flight-data from the electronic apparatus 18 to a base station at a push of a button. Other activations means can be employed.

According to yet other embodiments, the wireless communication device 186 includes a local display such as an LCD display, LED display. According to these embodiments, the local display provides the user with information concerning one or more flights of the arrow. The information can include information such as maximum, minimum and/or average values of speed, kinetic energy, momentum or vibration, for example. That is, according to this embodiment, the microcontroller 52 includes an algorithm that employs the flight-data to determine one or more of the preceding values for display on the local display.

According to another embodiment, the communication interface 186 includes or one or a plurality of discrete (i.e., single) LEDs which are used to communicate information to a user. Where discrete LEDs are used they can communicate information via any of constant illumination, blinking, a rate-of-blinking, or their color. Further, where a plurality of LEDs are employed together they can also communicate information by the pattern that they provide together. Thus, for example, one or a plurality of LEDs can operate in a predetermined manner where any of predetermined values of speed, kinetic energy, momentum or vibration are reached, or conversely, not reached, such as maximum or minimum values.

As one example, the manner in which one or a plurality of LEDs is lit can provide a user with an indication of a performance of archery equipment. Where an arrow's spine (static spine and/or dynamic spine) is poorly matched with a bow the communication interface can provide feedback to the user that a vibration threshold has been reached or exceeded.

According to some embodiments, the electronic apparatus 18 can include any of the preceding features or combination of features described with reference to FIG. 12, where all or a portion of the electronic apparatus 18 is included in the arrowtip 20 and/or the shaft 82. Thus, for example, an electronic apparatus included in an arrowtip 20 can include the wireless communication interface 186 including versions in which the wireless communication interface includes a display, or one or a plurality of LEDs.

Figure 5:
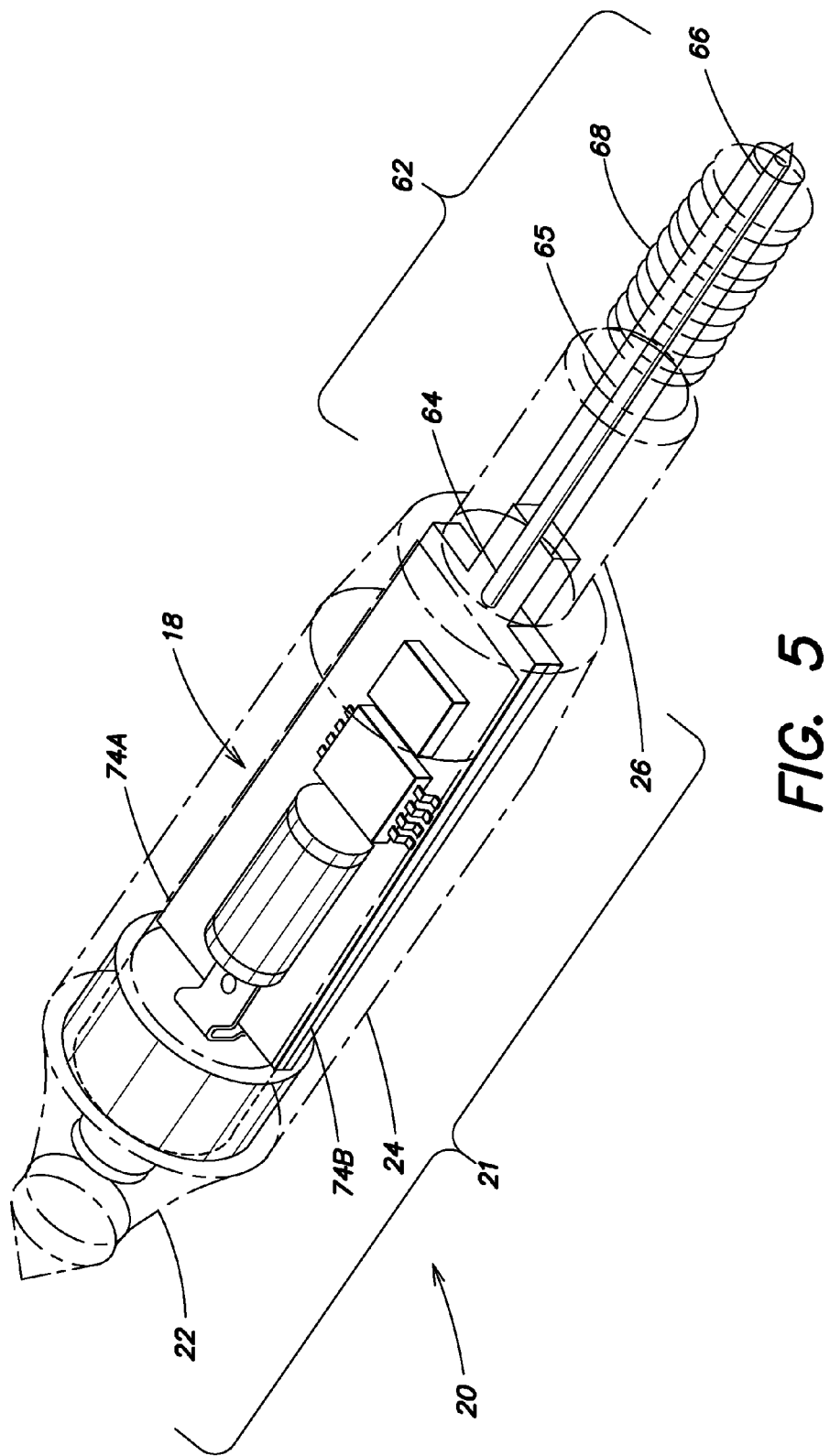
FIG. 5 illustrates an electronic apparatus included in an arrowtip in accordance with one embodiment.

Referring now to FIG. 5, electronic apparatus 18 is illustrated in accordance with another embodiment. In the illustrated embodiment, the printed circuit board 32 and associated components illustrated in FIG. 3 is included within an arrowtip 20. In the illustrated embodiment, the electronic apparatus includes a hardwired communication interface for communicating any of data stored in the arrowtip 20 (for example, data acquired by the electronic apparatus 18 in flight) to a device external to the arrowtip as well as to communicate commands, and/or instructions between the electronic apparatus 18 and a device external to the arrowtip 20. According to one embodiment, the electronic apparatus employs a 1-wire communication bus, for example, where the communication bus includes two conductors where one of the two conductors is ground.

In the illustrated embodiment, the electronic apparatus includes a communication pin 62 that includes a distal end 64, a mid-region 65 and a proximate end 66. Further, in the illustrated embodiment, the distal end 64 of the communication conductor 62 is connected to the remainder of the electronic apparatus 18 at the extension 46 of the printed circuit board 32. For example, in one embodiment, the first communication conductor 62 is surface-mounted on either or both of the first planar side 40 and the second planar side 42.

Further, in accordance with the illustrated embodiment, the arrowtip 20 provides a housing for the electronic apparatus including a hollow cylindrical region within the shaft 26 of the arrowtip. According to some embodiments, the mid-region 65 of the first communication conductor is located within the hollow region of the shaft 26 of the arrowtip. In the illustrated embodiment, the proximate end 66 of the first communication conductor 62 extends external to the shaft 26. According to a further embodiment, the arrowtip is manufactured of a conductive material such that it provides a conductive housing for the electronic apparatus 18. In some embodiments, the conductive housing 21 is employed in the hardware communication as a second communication conductor 68. In accordance with some embodiments, only a portion of the housing 21 is conductive. Regardless, however, where the housing 21 includes one or more conductive regions used in communication, the conductive region may be employed as a second communication conductor. In the illustrated embodiment, at least a portion of the shaft, for example, the threading is employed as the second communication conductor 68. The preceding approach can be employed to minimize the number of conductors, for example, conductive pins that may be employed to provide communication between the electronic apparatus 18 and any device external to the arrowtip 20.

Figure 6A:
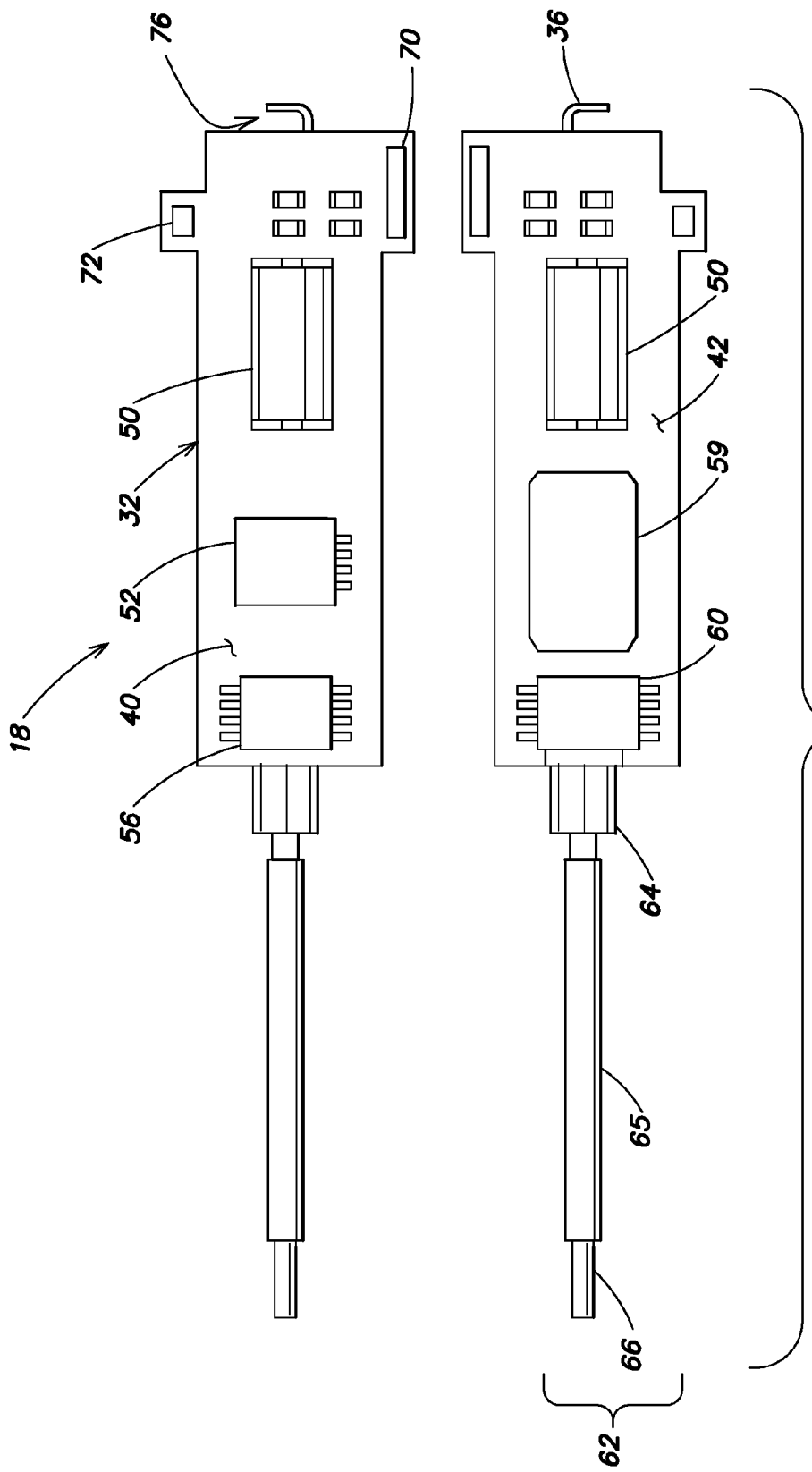
FIGS. 6A-6B illustrate an electronic apparatus in accordance with one embodiment.
Figure 6B:
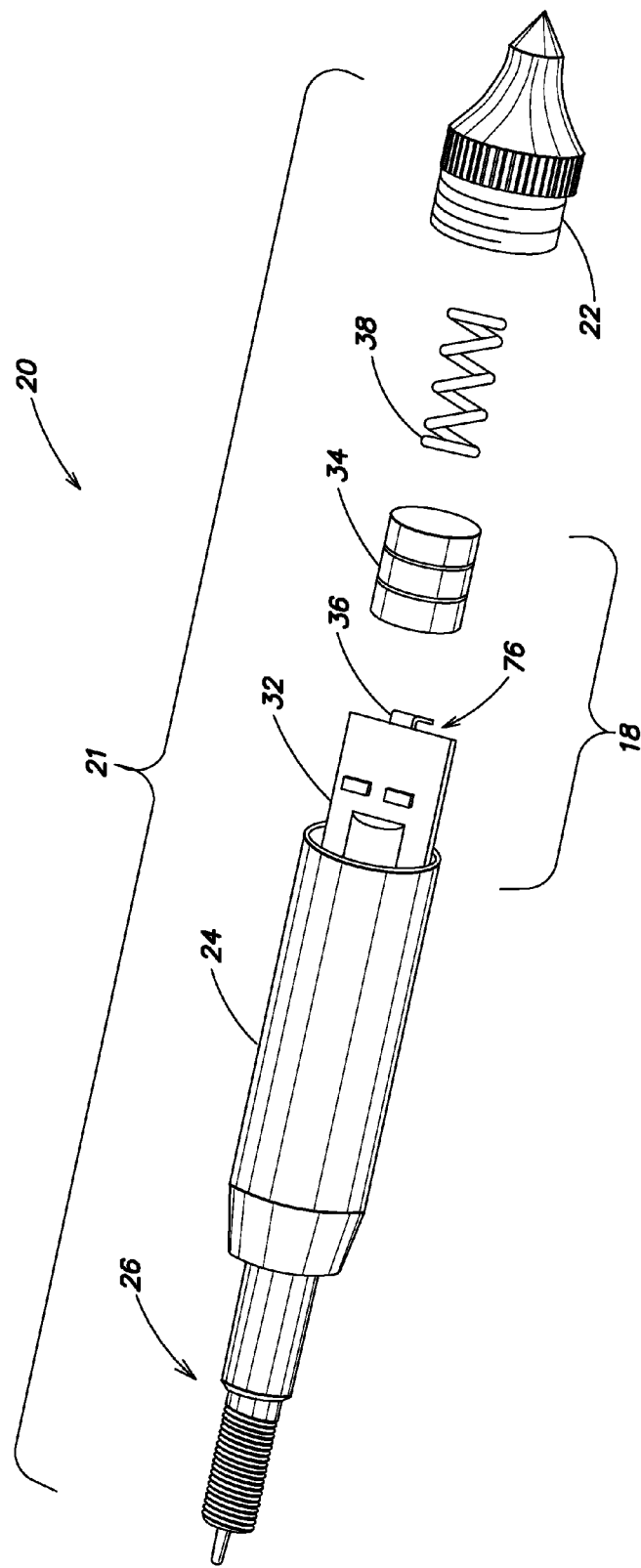

FIGS. 6A and 6B illustrate electronic apparatus in accordance with a further embodiment. FIG. 6A illustrates a printed circuit board 32 from both the first planar side 40 and the second planar side 42. The embodiment illustrated in FIG. 6A includes the shock sensor 50, the microcontroller 52, one or more passive components 54, memory 56, and a second sensor 60. In addition, in the illustrated embodiment, the electronic apparatus includes a connector 59. According to some embodiments, the connector 59 is a multi-pin connector employed to download firmware to the electronic apparatus and/or to communicate generally between the electronic apparatus 18 and base station such as a docking station and/or computer. Also illustrated in FIG. 6A, is the first communication conductor 62 including the distal end 64, the mid-region 65, and the proximate end 66. According to the illustrated embodiment, the distal end 64 is soldered to a contact surface on the second planar side 42 of the printed circuit board 32.

FIG. 6A also illustrates an embodiment where the printed circuit board 32 includes a first tab 70 and a second tab 72. In accordance with some embodiments, either or both of the first tab 70 and the second tab 72 include a contact surface which is configured to provide an electrical connection between the printed circuit board 32 and the housing of the arrowtip 20. Accordingly, in various embodiments, either or both the first planar side 40 and the second planar side 42 of the regions provided by the first tab 70 and/or the second tab 72 may include a contact surface. The contact surface may be employed, for example, to provide an electrical connection between the printed circuit board 32 and the power source 34, for example, a negative or ground path in the circuitry of the electronic apparatus 18. Further, a contact surface provided by either or both of the first tab 70 and the second tab 72 may be employed to provide an electrical connection between the printed circuit board 32 and the second communication conductor 62, for example, where the second communication conductor is provided by the housing 21 of the arrowtip 20. In other embodiments, the printed circuit board may not include any tabs but may still provide an electrical connection to the housing 21 at one or more locations along an edge of the first planar side 40 and/or the second planar side 42. For example, referring back to FIG. 5, an edge 74 that runs the length of the printed circuit board 32 may include one or more contact regions that provide an electrical connection between the printed circuit board 32 and the arrowtip housing 21 when the electronic apparatus is located within the housing 21.

In addition, according to some embodiments, the housing for example, an interior of the main cavity of the housing 21 may provide slots at least as long as the length of the main region of the printed circuit board to allow the printed circuit board to slide within the slots when installed within the housing 21. According to a further embodiment, lengths of the slots within the main cavity of the arrowtip 20 extend only a portion of a length of the printed circuit board 32. For example whether a full length of the cavity 75 or a portion thereof, the slots may accommodate the first tab 70 and the second tab 72 to fixedly align the printed circuit board within the arrowtip 20 and/or provide an electrical connection between the housing 21 and a printed circuit board 32.

Referring now to FIG. 6B, the electronic apparatus is illustrated partially withdrawn from the arrowtip housing in a first view. FIG. 6B illustrates electronic apparatus 18 including the printed circuit board 32 and power source 34. Further, the illustrated embodiment provides a first portion of the housing 21 which includes the body 24 and the shaft 26 disassembled from a second portion of the housing 21 which is provided by the cap 22. Further, the FIG. 6B illustrates the second spring contact 38 removed from the cap and also illustrates the first spring contact 36 located at the distal end of the printed circuit board. As illustrated in both FIGS. 6A and 6B, a gap 76 separates a resilient portion of the first spring contact 36 from the distal end of the printed circuit board 32. According to some embodiments, the gap allows for the deflection of the spring contact 36 during either or both launch or impact of the arrowtip 20 during a flight of the arrow.

In accordance with some embodiments, the electronic apparatus 18 is employed to generate data during a flight of an arrow when launched from a bow, to store the data and to communicate the data to a device external to the arrow. According to alternate embodiments, the data need not be communicated to a device external to the arrow. Instead, a local display or indicating lamp(s) are included in the electronic apparatus 18 such that information concerning a flight of the arrow is provided by the electronic apparatus without communicating the data to a device external to the arrow. According to a further embodiment, the electronic apparatus 18 can employ wireless communication to communicate with a device external to the arrow. Accordingly, in these embodiments, the electronic apparatus can include any of a wireless transmitter, a wireless receiver and a wireless transceiver.

Figure 7:
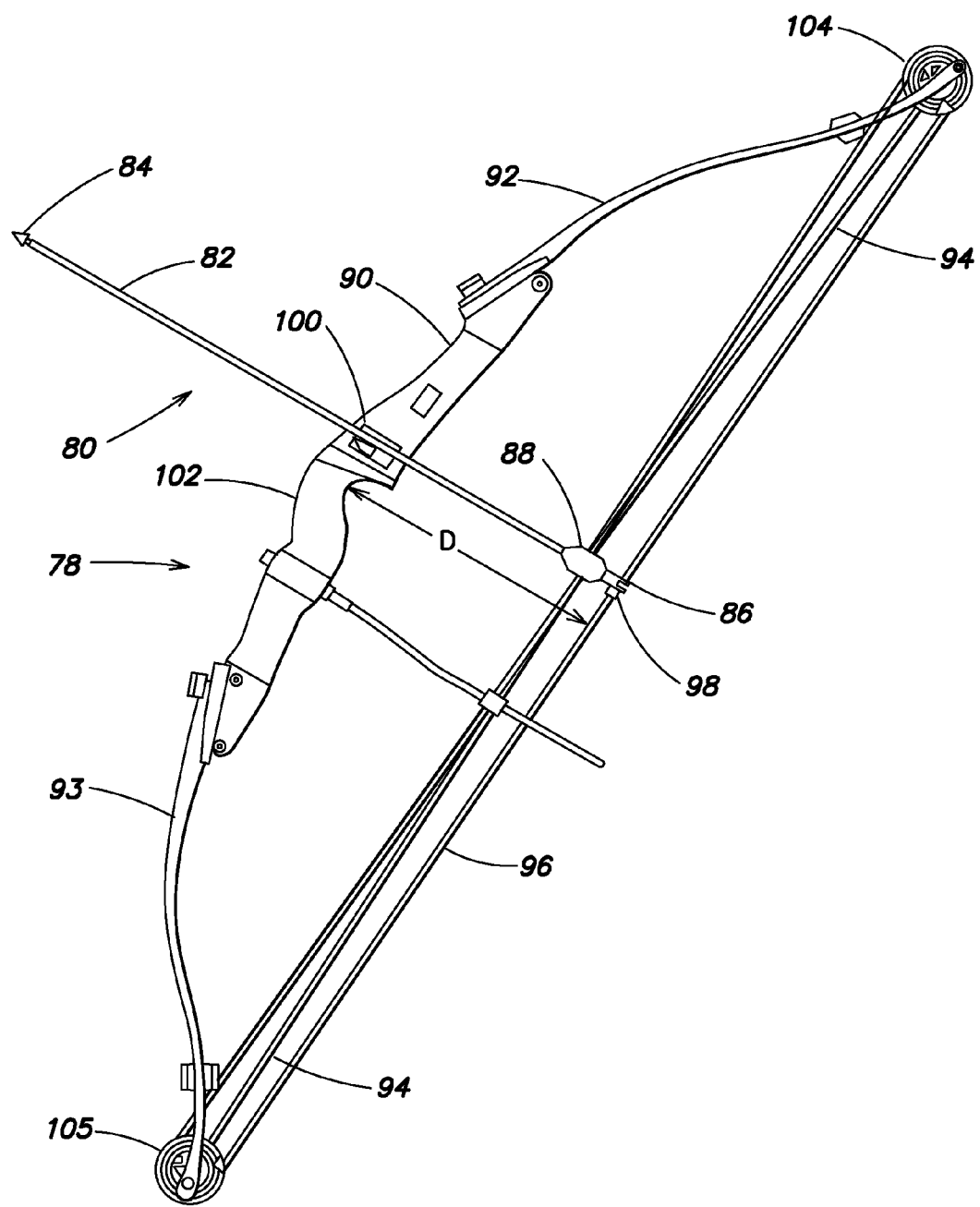
FIG. 7 illustrates a bow and arrow in accordance with one embodiment.

According to some embodiments the electronic apparatus 18 is configured to collect data concerning a flight of an arrow in which it is included for any of a launch-phase of flight, free flight and an impact-phase of flight. Referring to FIG. 7, a bow 78 and an arrow 80 are illustrated in accordance with one embodiment.

In accordance with the illustrated embodiment, the arrow includes a shaft 82, a tip 84, a nock 86 and fletching or vanes 88. In some embodiments, the electronic apparatus 18 is included in the tip 84, included in the shaft 82, or included in the nock 86. Further, in some embodiments, portions of the electronic apparatus may be located in each of the tip 84 and the shaft 82. In further embodiments, portions of the electronic apparatus 18 can be located in each of the shaft 82 and the nock 86. In still a further embodiment, portions of the electronic apparatus 18 can be located in each of the shaft 82, the tip 84 and the nock 86. For example, modern arrows often include a hollow central region within the shaft 82 wherein one or more components of the electronic apparatus can be located.

In accordance with the illustrated embodiment, the bow 78 includes a riser 90, an upper limb 92, a lower limb 93, cables 94, a bow string 96, an arrow rest 100 and a grip 102. Further, a nocking point 98 may be included on the bow string 96. In general, the bow is operated by locating the arrow 80 on the arrow rest 100 and sliding the proximate end of the arrow to engage the bow string 96 using the nock 86. In some embodiments, the nocking point 98 assists the archer in engaging the nock 86 with the bow string 96 in a consistent position that provides a desired flight of the arrow. In the illustrated embodiment, the bow also includes an upper wheel or cam 104 and a lower wheel or cam 105. As is known in those of skill in the art, where the bow 78 is a compound bow either or both of the upper wheel or cam 104 and lower wheel or cam 105 includes a cam to provide a mechanical advantage and reduce the force held by the archer at full draw.

FIG. 7 also illustrates a distance D between a portion of the riser 90 and the bow string 96. As illustrated, the bow has not been drawn from an "at rest" configuration. In this configuration, the bow does not yet provide any stored energy in which to launch the arrow 80. Further, the bow string 96 remains in the at-rest or neutral position N with the bow 78 in this configuration. As referenced herein, the distance D illustrated in FIG. 7 refers to a distance between the bow string 96 when it is in the neutral position N and the pivot point of the bow's grip 102 measured perpendicular to the bowstring. This is sometimes referred to as the brace height of a bow. Further, in accordance with some embodiments, the pivot point refers to the most recessed part of the bow handle and is located directly below the hole drilled for the arrow rest 100.

Figure 8:
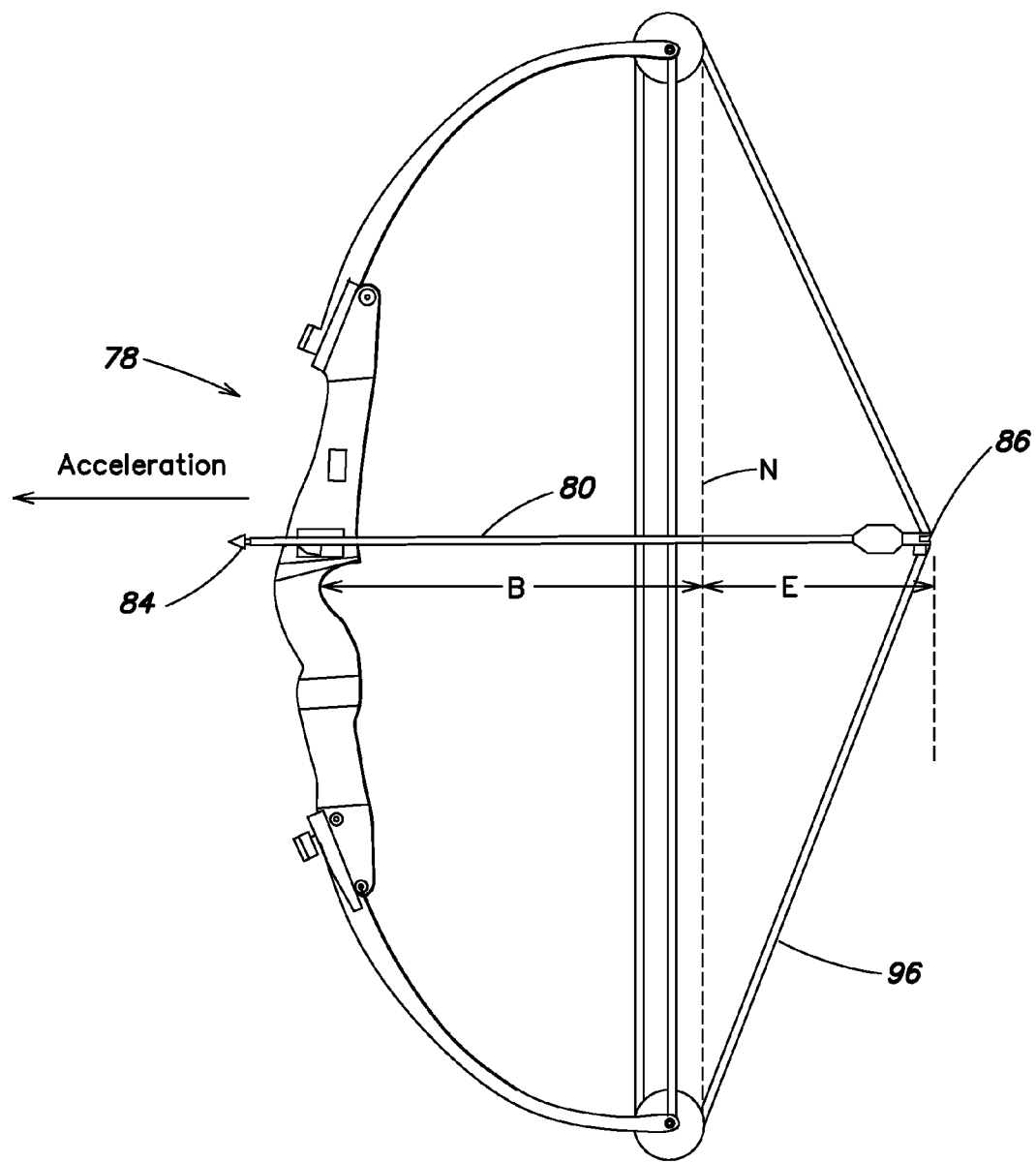
FIG. 8 illustrates the bow and arrow of FIG. 7 at full-draw in one embodiment.

Referring now to FIG. 8, the bow 78 is illustrated with the arrow 80 in a fully drawn position. That is, FIG. 8 illustrates the bow 78 as it would appear when the archer has drawn it prior to taking a shot and before releasing the bow string from their grip. The manner in which the bow string 96 is gripped can vary in accordance with various embodiments, for example, the bow string may be gripped using the fingers of the archer, or alternatively, using a release aid such as a caliper grip with or without a string loop. FIG. 8 also illustrates a distance E from the neutral position of the bow string 96 to its fully-drawn position at the nocking point 98. The neutral position N of the bow string is illustrated in phantom in FIG. 8. The release of the arrow allows the energy stored in the upper limb 92 and the lower limb 93 to be transferred to the arrow 80 to propel it in a direction of the acceleration arrow, i.e., towards its intended target.

As described above, a flight of the arrow may include any of a launch phase, a free flight-phase and an impact-phase. Referring again to FIG. 8, according to some embodiments, the launch phase is the period of flight of the arrow after release by the archer until the nock 86 travels forward to the neutral position N of the bow string 96. According to this embodiment, free flight begins when the nock 86 travels forward through the neutral point N.

High speed video recordings demonstrate that in practice, the bow string 96 can travel forward in the direction of the acceleration arrow past the neutral position N of the bow string when an arrow is launched. This forward travel of the bow string beyond N can occur with the nock 86 remaining engaged with the bow string 96 for some portion of the bow string's travel forward of the neutral position.

According to some embodiments, the impact-phase begins when the arrowtip 84 first impacts a target-face of the target struck by the arrow 80. According to further embodiments, the impact-phase ends when the arrow acceleration in the forward direction (for example, x-axis acceleration in the direction of arrow flight) becomes zero. In other embodiments, the impact-phase ends when the post-impact vibrations and/or oscillations cease, or alternatively decrease below a predetermined threshold.

As mentioned above, the arrow 80 may be equipped with an electronic apparatus that includes one or more sensors that provide data (for example, one or more output signals) that can be stored during the flight of the arrow 80. According to some embodiments, the sensors can be employed to detect any of a time-of-flight, or acceleration in one or more axes relative to the arrow 80. In some embodiments, this data can be used to determine one or more instantaneous values that can be provided to an archer to assist the archer to evaluate archery equipment, making adjustments to increase the performance of archery equipment and/or to select or modify archery equipment. Further, in various embodiments, the electronic apparatus 18 can communicate information concerning any of the preceding characteristics to a device external to the arrow. This communication may be via hardware communication interface and/or a wireless transmission.

Figure 9:
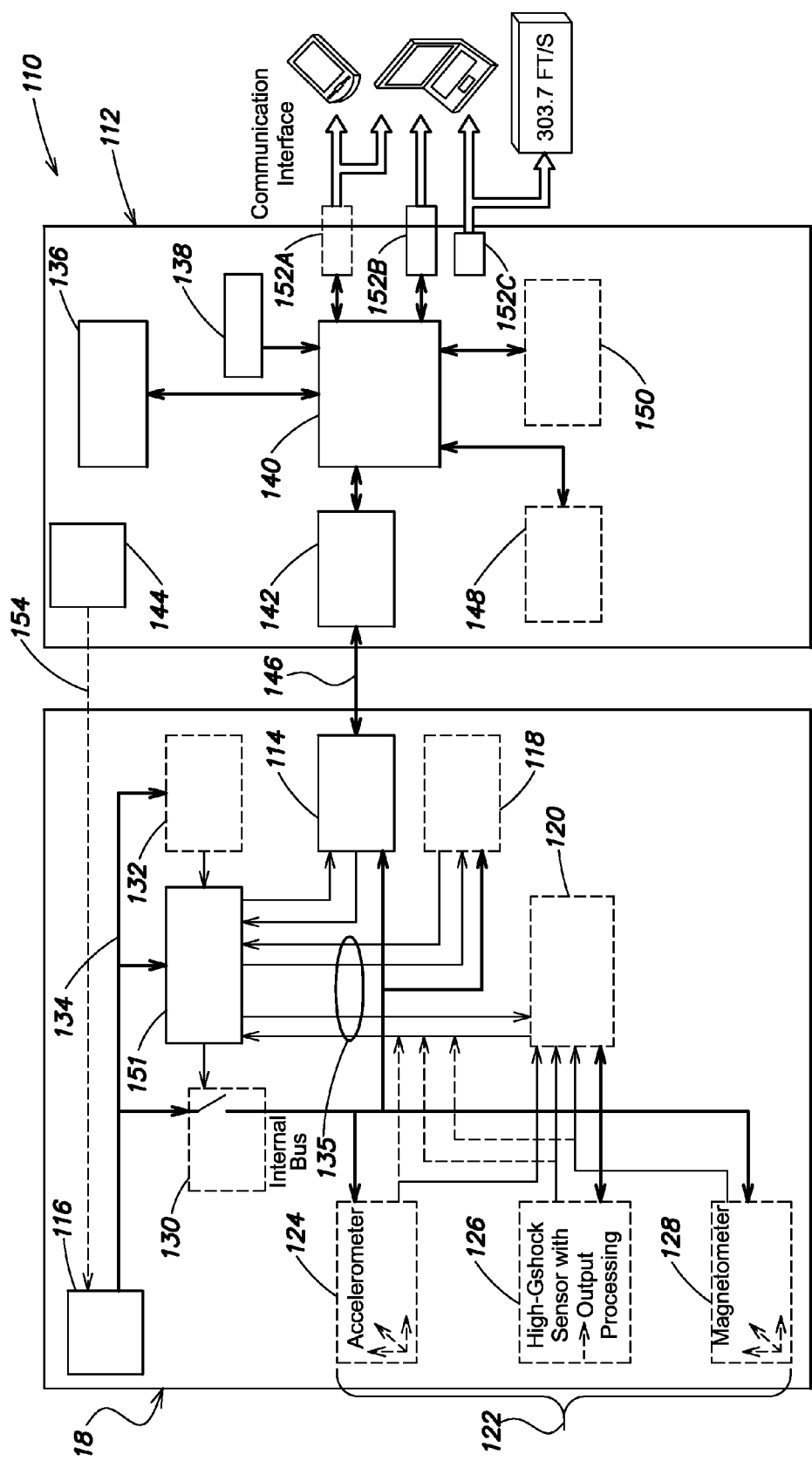
FIG. 9 illustrates a system including an electronic apparatus in accordance with another embodiment.

Referring to FIG. 9, a system 110 includes the electronic apparatus 18 and a base station 112. In accordance with the illustrated embodiment, the electronic apparatus 18 includes a microcontroller 151, a communication interface 114, and a power source 116. According to various embodiments, the power source may include a replaceable battery, and/or a rechargeable battery. In an alternate embodiment, the power source 116 may include a super capacitor. The electronic apparatus 18 illustrated in FIG. 9 may also include one or more additional components, circuitry and/or functionality as illustrated in phantom. For example, in some embodiments, the electronic apparatus 18 includes a memory 118 that is external to the microcontroller 151. In accordance with a further embodiment, the electronic apparatus can include an analog-to-digital converter (ADC) 120. Further, according to various embodiments, the electronic apparatus 18 includes one or more sensors 122 which may include, depending upon the application, multi-axis accelerometer 124, a shock sensor 126, a magnetometer 128 and a gyroscope.

In addition to or in combination with the preceding, the electronic apparatus may also include power management circuitry or apparatus 130 that can include hardware to isolate the power source 116 to prevent operation of the apparatus and/or draining of power from the power source when the electronic apparatus 18 is not in use. Further, the electronic apparatus 18 can include device activation circuitry and/or devices 132 that operate to place the electronic apparatus 18 into an active state at or prior to a release of the arrow from the bow. As illustrated, the various components may be supplied power via a power bus 134. Further, an internal communication bus 135 may be employed to allow the various devices and/or circuitry included in the electronic apparatus 18 to communicate with one another. For example, data from the sensors may be communicated to any of the microcontroller 151, memory 118, and/or ADC 120.

According to one embodiment, the communication bus 135 includes an I$^2$C communication bus. According to a further embodiment, the communication bus 135 is configured such that the microcontroller 151 is the master while other connected devices are slaves (for examples, memory 118, any of the plurality of sensors 122, etc.). According to another embodiment, the communication bus 135 is a serial peripheral interface bus (SPI).

In the illustrated embodiment, the base station includes a display 136, an operator interface 138, a microprocessor 140, a communication interface 142 and a power source 144. In accordance with one embodiment, the display 136 is an LCD text display while in an alternate embodiment the display 136 is a graphical LCD display. The operator interface can include one or more push buttons or keys and according to some embodiments can be included with the display 136 as a single operator interface. The microprocessor 140 in some embodiments may be included in a microcontroller.

Where hardware communication is employed, a communication bus 146 can be used provide hardware communication interface between the electronic apparatus 18 and the base station 112. According to some embodiments, the external communication bus is a serial bus, for example, a single wire serial communication bus. Further, where a hardwired communication bus is employed the base station 112 can include a connector configured to complete an electrical connection with one or more communication pins included in the electronic apparatus 18, for example, the communication pin 62.

In accordance with some embodiments, the base station 112 includes a first memory 148 and a second memory 150. According to one embodiment, the first memory is permanently located in the base station 112 while the second memory is a removable memory, for example, a removable flash memory such as in the micro SD format or other types of flash memory cards. Other forms of memory may be used for either of the first memory or the second memory. According to some embodiments, the first memory 148 is a flash memory while in other embodiments the first memory 148 is EEPROM memory. In yet a further embodiment, the base station 112 includes each of flash memory and EEPROM memory.

According to some embodiments, the base station 112 includes a communication interface 152 that allows the base station to communicate with one or more external systems and/or devices such as a computer, a personal digital assistant (PDA), a local display and a remote server. In some embodiments, the communication interface 152 includes one or more of a USB port 152A or other hardware serial communication and one or more wireless communication interfaces 152B, 152C such as an optical communication interface, a BLUETOOTH communication interface or a Wi-Fi communication interface for communication between the base station 112 and an external device such as a computer, mobile phone, IPHONE, PDA or local display.

Further where the electronic apparatus includes a power source 116 that is rechargeable recharging circuitry may connect the electronic apparatus to the base station 112 to provide recharging of the power source 116 included in the electronic apparatus 18. Thus, for example, connection of the electronic apparatus 18 to the base station 112 may allow the base station 112 to provide power to recharge the power source 116 (such as batteries) included in the electronic apparatus 18.

According to some embodiments, the external communication between the electronic apparatus 18 and the base station 112 is wireless. Accordingly, in some embodiments, the electronic apparatus includes a wireless transmitter and the base station 112 includes a wireless receiver. Further, where bi-directional communication is desired, each of the electronic apparatus 18 and the base station 112 can include a wireless transceiver that allows communication between the apparatus 18 and the base station 112.

According to some embodiments, the communication interface 152 employs General Packet Radio Service (GPRS) to communicate to other systems and/or devices. For example, according to one embodiment, the communication interface employs GPRS to communicate to a remote server.

According to some embodiments, the electronic apparatus 18 stores the flight-data for a series of shots where the flight data is communicated post-flight for further processing (via either a wired or a wireless communication). According to an alternate embodiment, the flight-data is communicated on a substantially real-time basis from the electronic apparatus. According to this embodiment, the electronic apparatus 18 transmits the flight-data during a flight of the arrow. In some embodiments, the transmission of flight data begins when the electronic apparatus 18 is activated from a sleep mode. In another embodiment, the transmission of flight data occurs following a detection of a target-impact by the electronic apparatus 18.

According to some embodiments, the electronic apparatus 18 collects the flight-data and the base station 112 performs processing to generate processed flight-data that provide quantitative data that can be reviewed by a user to analyze the arrows' flight. In other embodiments, the electronic apparatus 18 performs the processing to generate processed flight-data that provide quantitative data that can be reviewed by a user to analyze the arrows' flight. In still another embodiment, the electronic apparatus 18 collects the flight-data and directly communicates it (without aid) of the base station to a PDA, PC, tablet, netbook, local display or remote server which perform the processing to generate processed flight-data that provides quantitative data that can be reviewed by a user to analyze the arrows' flight. The quantitative data can include discrete values or graphical representations such as data plots relative to time, relative to distance or relative to frequency, as some examples.

According to yet other embodiments, any of the base station 112, PDA, PC, tablet, netbook or USB drive provides transient storage of flight-data. Where such an approach is used, the flight-data can be communicated from the preceding devices, for example, via a network (such as a cellular network and/or the Internet) to a remote server for generating the processed flight data. The processed flight data can then be transmitted back over the network for review by the user. According to one embodiment, a report is generated at the remote server and transmitted via the network to the user (for example, in any of CSV, text, MSWord or PDF format). According to a further embodiment, the processed flight-data can be accessed "over-the-cloud" via one or more networks (LANS, WANS and/or the internet). According to one embodiment, the flight data is communicated to an internet-based application for processing, review and/or report generation. According to another embodiment, the flight-data is processed by application software (i.e., an app.) on the user's device.

Figure 13A:
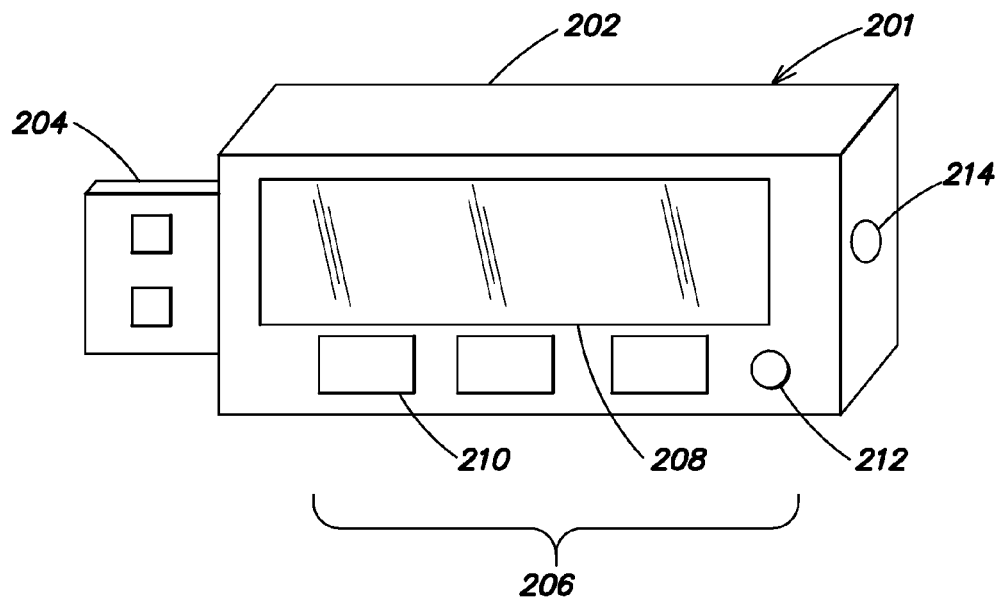
FIG. 13 illustrates a USB drive in accordance with one embodiment.
Figure 13B:
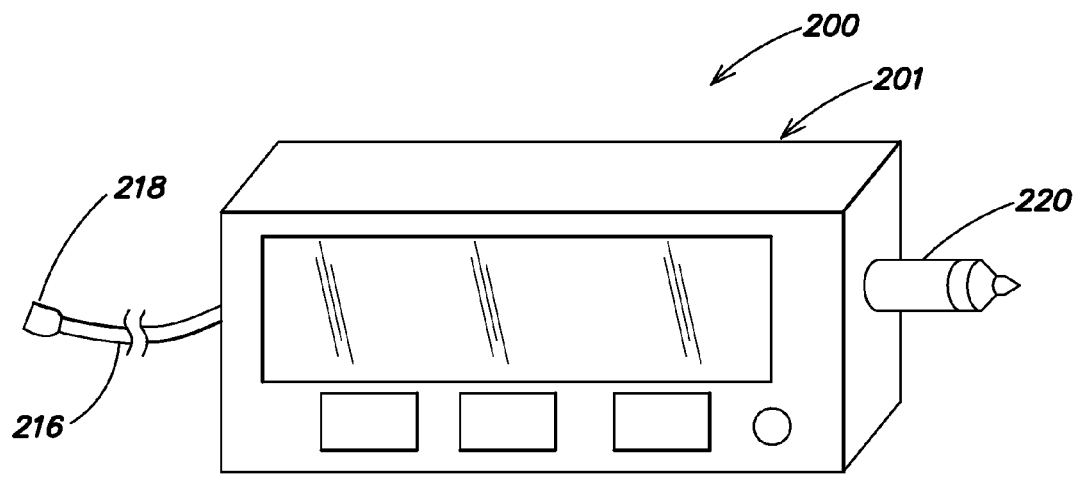

Referring now to FIGS. 13A and 13B, a system 200 is illustrated where the system includes a base station 201 and an arrow-mounted electronic device 220. According to the illustrated embodiment, the base station 201 includes a housing 202, a user interface 206, a connector 204, and a port 214. In accordance with one embodiment, the port 214 is employed to connect the base station 201 to the arrow-mounted electronic device 220. Further, in accordance with one embodiment, the user interface 206 includes one or more of a display 208, control element 210 (for example, push buttons) and one or more indicating lights 212.

In accordance with one embodiment, the base station 201 is provided in a USB flash drive. Accordingly, the base station 201 can include a flash memory data storage device integrated with a USB interface. In various embodiments, the connector 204 can include any of a type-A USB connector that provides a communication interface to a computer. In accordance with various embodiments, the communication interface 204 can include any of a standard-A plug, a standard-A receptacle, a standard-B plug or receptacle, a micro-B receptacle or plug, a mini-B plug or receptacle or a micro-A plug or receptacle.

In accordance with a further embodiment, the port 214 can be located in the base station 201 to allow the connection of an arrow-mounted electronic device 220 to the base station 201. In operation, the arrow-mounted electronic device 220 in included in an arrow during one or more flights of the arrow and records flight-data for the flight(s) for later download when the arrow-mounted electronic device 220 is coupled to the base station 201.

According to some embodiments, a push button or other element 210 is employed to download data from the arrow-mounted electronic device 220 to the base station 201 where it is stored for later download to a computer. In accordance with some embodiments, the user interface 206 provides additional features such as the display 208 that allow a user to uniquely identify each set of data and to review all or a portion of the flight data, or processed versions of the flight data to determine whether the data will either be saved in the base station 201, and if so, whether it will be downloaded to a computer. For example, in one embodiment, a user connects the electronic mounted arrow device 220 to the base station 201 by plugging it into the port 214 where the port includes a communication interface, for example, a communication interface 146 as illustrated in FIG. 9. According to this embodiment, the user then has an opportunity to employ the user interface 206 to download and save the stored flight data from the arrow-mounted electronic device 220 to the base station 201 with a unique identifier that will allow the user to later go back and review the flight data or, at a minimum, identify that set of flight data so that it can be downloaded to the computer.

According to one embodiment, the base station 201 provides transient storage for the flight-data. For example, the flight-data for multiple shots can be transmitted from the electronic apparatus 18 to the base station 201 when the user is at the archery range. When the user completes the shooting-session, the base station can be connected to the PC, netbook, tablet, mobile phone, IPHONE or PDA. In some embodiments, the flight-data is processed immediately for display to the user, for example, using an "app" included on the user's mobile phone. In other embodiments the flight-data is communicated over a network (for example, the Internet) to an application located on a remote server for processing.

In some embodiments, the elements 210 allow the user to scroll, for example, left to right or up and down through a series of stored data sets and select those that will be downloaded to the computer by the communication interface 204. In accordance with another embodiment, the flight data is automatically downloaded from the arrow-mounted electronic device 220 when the device 220 is connected to the base station 201 at the port 214. According to these embodiments, one or more indicating lights 212 are employed to indicate to a user the status of the information transfer. According to yet another embodiment, a user interface 206 is not included in the base station 201. Further, where one or more indicating lights 212 are included, the base station 201 can be programmed to provide different feedback by the color of the indicating lamp that is lit, the status of the indicating lamp (blinking, on-solid, etc.) or at a rate at which an indicating lamp 212 is changing state.

Referring now to FIG. 13B, a further embodiment is illustrated where the communication interface 204 includes a cable 216 and connector 218. According to the illustrated embodiment, the connector can include any of a standard-A plug, a standard-A receptacle, a standard-B plug or receptacle, a micro-B receptacle or plug, a mini-B plug or receptacle or a micro-A plug or receptacle.

Referring now to FIG. 14, a display 300 is illustrated for display of processed flight-data. According to various embodiments, the display 300 can communicate with the base station 112 over a hardwired communication interface or a wireless communication interface. In one embodiment, the display is located at an archery range where it can be seen by archers at the shooting lanes. According to this embodiment, the processed flight-data is displayed to inform the archers of their current status relative to other archers. The approach can be employed to promote competition based on values derived from the stored flight-data generated by one archer using their archery equipment versus the flight-data generated by other archers who are using their own equipment.

According to some embodiments, the base station 112 is provided in the form of a docking station that allows hardwire communication between the electronic apparatus 18 and the base station 112. For example, the electronic apparatus may be plugged into or otherwise physically connected to a base station 112 which is in the form of a docking station. Additional details concerning various embodiments of the electronic apparatus 18 and the base station 112 can be found in U.S. Ser. No. 12/982,456 which is incorporated by reference herein in its entirety.

Figure 10:
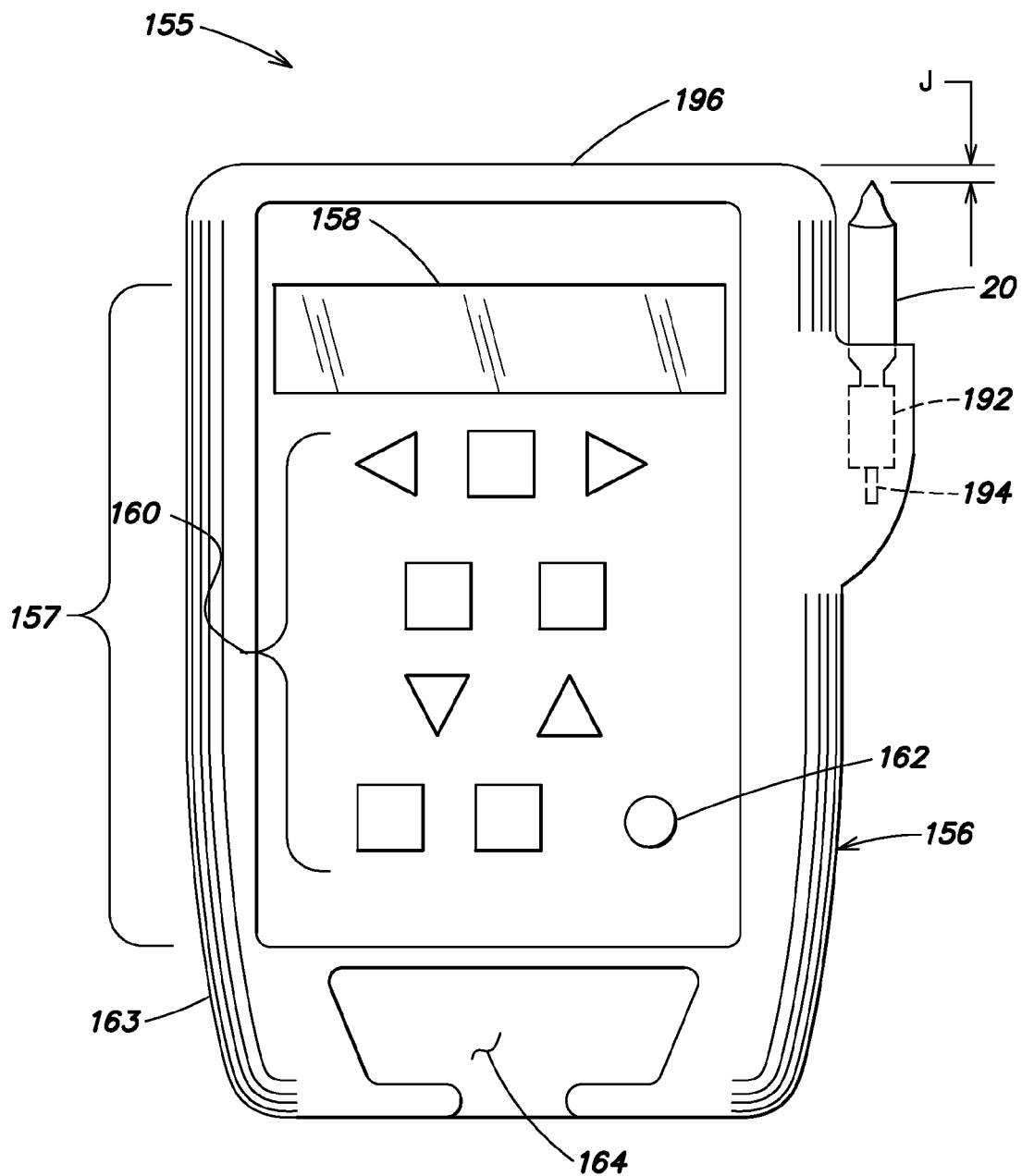
FIG. 10 illustrates a docking station in accordance with a further embodiment.

Referring now to FIG. 10, a system 155 including a docking station 156 and an arrowtip 20 is illustrated in accordance with one embodiment. In the illustrated embodiment, the docking station 156 is a hand-held unit and operates to allow a user to download data from the arrowtip 20 and display information concerning the flight characteristics of the arrow. In accordance with some embodiments, the docking station 156 also allows data and/or programs to be downloaded to the arrowtip 20. The docking station includes a user interface 157 provided by a display 158 and a keypad 160 that includes one or more keys. In accordance with one embodiment, the display 158 is a LCD text display with one or more lines. Further, according to one embodiment, the keypad 160 is a membrane keypad that also includes an on/off or power button 162 that allows a user to turn the docking station 156 on or off. According to one embodiment, the docking station 156 includes a power source such as one or more batteries. According to a version of this embodiment, the docking station 156 is powered by three AA batteries.

According to some embodiments, the docking station 156 is manufactured from plastic in a form factor that allows a user to easily grip the docking station 156 with one hand on either side of the docking station while manipulating the keys of the keypad 160 to operate the docking station to display the desired information concerning flight characteristics of the arrow that the arrowtip was employed with. According to one embodiment, the docking station also includes a grip 163 and a pocket or recess 164. According to one embodiment, the grip 163 is provided by a plurality of grooves located along the longitudinal edges of the docking station body. In an alternate embodiment, the grip 163 is provided by a series of raised longitudinal protrusions (or ribs) that extend along the longitudinal edges of the docking station 156.

Figure 11:
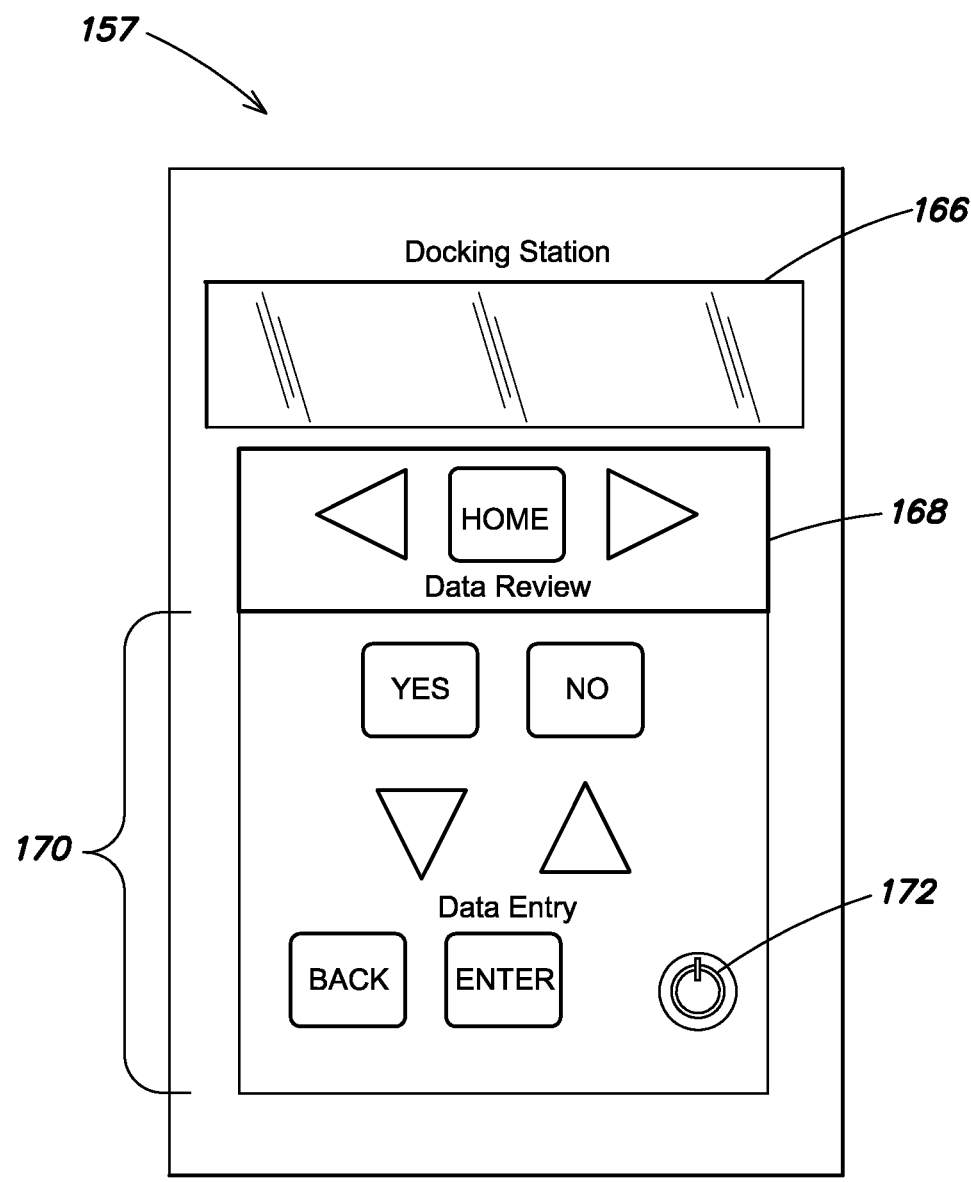
FIG. 11 illustrates a user interface for a docking station according to one embodiment.

The pocket or recess 154 can be provided to allow a user to store arrowtip 20 when not in use. Further, the pocket 164 can be employed to store one or more conventional field points for example a conventional field point that is removed from an arrow during operation with an arrowtip 20 that includes the electronic apparatus 18. Referring now to FIG. 11, the user interface 157 (for example, a membrane keypad) is illustrated in accordance with one embodiment.

In the illustrated embodiment, the membrane keypad includes a window 166, a plurality of data review keys 168 and a plurality of data entry keys 170. According to one embodiment, the window 166 goes over the region of the display 158 when the membrane keypad is located on the docking station.

As mentioned above, the electronic apparatus 18 can be included in an arrow for one or a plurality of flights and collect flight-data for each of the plurality of flights. According to one embodiment, the electronic apparatus 18 is removed from the arrow following a predetermined number of flights and then connected to the docking station 156, for example, via a threaded connection to the docking station as illustrated in FIG. 10. Thus, according to one embodiment, the docking station includes a receptacle 192 to receive the shaft of the arrowtip 20. In a further embodiment, the receptacle 192 includes threading in compliance with the ATA/ARR-204-2008 technical guidelines for threaded replacement points to allow the docking station to be connected to an arrowtip 20 having a threaded shaft that also meets the dimensions provided by these guidelines. The docking station 156 can then be employed to download flight data which may include any of the following alone or in combination: acceleration data, shock sensor operation data, magnetometer output data or other information from the arrowtip 20 when it is connected to the docking station 156.

In some embodiments, the docking station 156 also provides an electrical connection 194 configured to receive one or more communication contacts included in the electronic apparatus 18. In one embodiment, the electrical connection 194 is configured to provide an electrical connection with a communication conductor in the form illustrated here as first communication conductor 62 in FIG. 5. The electrical connection can also provide a connection to a conductive housing of the arrowtip 20 where such an arrowtip construction is employed. In various embodiments, the electrical connection 194 is employed to communicate flight-data from the electronic apparatus 18 to the docking station 156 or other form of base station. According to another embodiment, the electrical connection 194 is employed to download embedded software from the docking station 156 or other form of base station to the electronic apparatus.

Although FIG. 10 illustrates a docking station employed with an arrowtip 20. The docking station 156 can provide a hardwired communication connection with other configurations including the electronic apparatus. In one embodiment, the docking station provides the electrical connection 194 for use with an electronic apparatus included in a nock.

In some embodiments, the dimensions of the docking station 156 and the location of the receptacle 192 are configured to locate the distal end of the arrowtip 20 at an elevation that recesses the distal end of the arrowtip 20 relative to an outer surface of the docking station 156. As illustrated in FIG. 10, the distal end is recessed relative to the surface 196 of the docking station by a distance J. The preceding feature can be advantageous in preventing the distal end of the arrowtip 20 from accidentally making contact with another object when connected to the docking station.

In various embodiments, the docking station can be equipped for wired or wireless communication with another device, for example, as illustrated with reference to the base station 112 illustrated in FIG. 9. In one embodiment, the docking station 156 includes a USB port.

In accordance with one embodiment, the plurality of data review keys can allow the review of data stored in the docking station which was downloaded from the electronic apparatus post-flight. For example, the data review keys may allow a user to select a shot-group that includes data for one or a plurality of shots. Further, the data can be processed by the docking station 156 that it is displayed in a more meaningful way to a user. For example, the docking station 156 can process acceleration data received from the electronic apparatus to generate one or more of average values for velocity, kinetic energy, and momentum or instantaneous values of any of the preceding. In addition, the docking station 156 can process the received-data to provide information concerning vibration in any one of a plurality of axes of the arrow where the vibrations occurred during any phase of the flight, for example, launch, free-flight, or impact-phase of the arrow's flight for one or a plurality of shots as may be included in a shot group.

According to one embodiment, the data entry keys 170 allow a user to generate a unique identification for the data stored for each shot group such that a user can store the data in the docking station for ease of later retrieval and review. Where the display 158 includes a text display, the user may review analog discrete values via the data review keys in a series of prompts that are generated by the docking station 156 and displayed in the display 158. In a further embodiment where the display 158 includes a graphics display, flight-plots may be provided in the display to allow a user to review flight data over a period of time and/or distance of the flight (travel).

According to some embodiments, the flight-data acquired by the electronic apparatus can be processed to provide any of speed, kinetic energy, momentum, vibration data and the like for display. According to the preceding embodiments, the data is communicated to the base station (for example, the docking station 155) where it is processed to generate the values for display from the flight-data collected in flight. According to alternate embodiments, all or some of the processing and generation of values for display are performed by the electronic apparatus 18.

According to still another embodiment, the base station 112 stores the flight-data for communication to another system and/or device for processing where any of speed, kinetic energy, momentum, vibration data and the like are derived from the flight-data.

Referring to FIG. 10, operation of the docking station can include the following functionality in accordance with one embodiment. According to one embodiment, the docking station is configured to store multiple sets of data collected and downloaded from the electronic apparatus where for example, each shot-set includes a maximum of ten shots taken with the electronic apparatus for each set of data. Each data set for up to 10 shots will be identified by a Shot Set ID in the form of a multi-character Alpha-Numeric ID. The docking station can store multiple unique Shot Sets.

In one embodiment, the docking station is equipped for auto shutdown following a 10 minute period of inactivity of the keypad.

According to one embodiment, for each shot, the display will display: velocity at launch; velocity at impact; kinetic energy at launch; kinetic energy at impact; momentum at launch; and momentum at impact. Thus, in one embodiment, the first 6 screens for a shot set of data will display the preceding for shot 1 in the above sequence, the next 6 screens for the given shot set will display the above for shot 2, etc. According to another embodiment, the data for each shot is separately accessed from a higher level menu accessible via the user interface of the docking station.

In a further embodiment, for each shot set the docking station will also display the following average values (for all shots included in the shot set): average velocity at launch; average velocity at impact; average kinetic energy at launch; average kinetic energy at impact; average momentum at launch; and average momentum at impact.

In addition in some embodiment, for each shot set the docking station will also display the following standard deviation value based on the data for the shots of the shot set: launch velocity standard deviation; impact velocity standard deviation; launch kinetic energy standard deviation; impact kinetic energy standard deviation; launch momentum standard deviation; and impact momentum standard deviation.

In various embodiments, other information can be provided by the docking station either alone or in combination with one or more of the preceding pieces of information.

According to some embodiments, an electronic apparatus (for example, the electronic apparatus 18) included in an arrow provides each of a time-of-flight and acceleration data that allow the determination of one or more instantaneous values for velocity, kinetic energy and/or momentum. In some embodiments, data provided by one or more of the plurality of sensors (for example, the sensors 122) included in the apparatus provide the information used to determine time-of-flight and arrow acceleration in flight.

According to some embodiments, determination of the instantaneous values is achieved, in part, by determining a distance of arrow flight (generally, the distance from the archer to the target) and a time-of-flight. According to one embodiment, the time-of-flight is the time of free-flight that is the time of travel from the time when the proximate end of the arrow is propelled forward from the neutral point N of the bow string to the time the arrow strikes the face of the target. Accordingly, in some embodiments, the distance of flight D is the distance from the position of the neutral point of the bow string N (that is the horizontal position) to the position of the target-face less a length of the arrow. In one embodiment, the length of the arrow includes the length of the shaft plus a length of a region of the arrowtip which extends forward of the distal end of the shaft. In a further embodiment, the length of the arrow also includes a length of a region of the nock which extends rearward the proximate end of the shaft.

In accordance with some embodiments, the system (for example the system 110) determines a time-of-flight based on information provided by either or both of the shock sensor and an accelerometer. According to further embodiments, the electronic apparatus provides information that is used to determine a time-of-launch $t_L$ and a time-of-impact $t_I$. The preceding information can be employed by the system to determine a time-of-flight as $t_I$-$t_L$.

For example, a shock sensor set with an appropriate activation value (for example, as measured by the g force at which it activates) can trigger at or during the release of the arrow from the bowstring to provide a time-of-launch. Further in some embodiments, the same shock sensor or another shock sensor included in the electronic apparatus 18 will activate upon target-impact by the arrow. According to another embodiment, an output of one or more axes of the accelerometer included in the electronic apparatus 18 register a value at launch that can be used to determine a release of the arrow. In a further embodiment, an output provided by the same or other axes of the accelerometer can be employed to determine target impact. For example, the output of one or more axes of the accelerometer may register a peak value at or during launch and/or at impact.

According to another embodiment, one or more accelerometer digital outputs can be used to generate interrupts to the microcontroller for determining a time-of-launch and/or a time-of-impact. For example, an activity interrupt can be employed to determine a time of launch by generating an output (for example, setting a value of a bit) when acceleration greater than a predetermined threshold is experienced by the accelerometer on a selected axis. In another approach, a free-fall interrupt can be similarly employed to determine, for example, the start of free-flight as a point in time when an acceleration less than a predetermined threshold is experienced for greater than a predetermined amount of time. In other embodiments, a single-tap interrupt or a double-tap interrupt can be employed to identify either or both of a time-of-launch and a time-of-impact. Where a single tap interrupt is employed a single acceleration event greater than a predetermined value which occurs for less than a predetermined amount of time can be employed. A double tap interrupt can be activated when two acceleration events greater than a predetermined value which occurs for less than a first predetermined amount of time with the second event occurring more than a second predetermined amount of time following the first event but less than a third predetermined amount following the first event. The use of single tap and double tap interrupts may be of particular advantage where as in archery the acceleration at launch and deceleration at impact provide acceleration peaks that are of the nature of acceleration impulses because the peaks provide rapid changes in the acceleration for short periods of time.

Where a multi-axis accelerometer is employed, the interrupts can be triggered when the thresholds are sensed by: a selected one of the axes; any one of the axes; or all of the axes, depending upon the embodiment. Further, the use of accelerometer interrupts for sensing launch and/or impact may be advantageous when compared with the use of a shock sensor because a user can test the electronic apparatus 18 and adjust the thresholds during testing to determine the threshold that most accurately detects launch and/or impact.

Referring now to Eq. 1, a launch velocity is determined from data provided by electronic apparatus 18 included in an arrow during flight as follows:

$$V_L = \frac{D + \frac{AT^2}{2}}{T} \qquad \text{Eq. (1)}$$

where,
D=distance of flight;
A=acceleration of the arrow in flight (approximated by a constant value A);
T=total time-of-flight; and
$V_L$=velocity at launch In practice, the acceleration sensed by an accelerometer during a flight of the arrow is a result of the drag forces encountered by the arrow during flight. The drag forces will be explained in greater detail below but generally result from the resistance provided by the medium through which the arrow travels (i.e., air). Equation 1 applies to situations where the acceleration of the arrow in-flight is (or is approximated by) a constant value. In this circumstance, the acceleration A has the same value throughout the flight and the velocity decreases linearly from the time of launch to the time of impact. According to one embodiment, the value A is the average value of the acceleration data provided by an accelerometer for a free-flight portion of the arrow's flight.

Referring now to Eq. 2, a determination of an instantaneous value of velocity can be performed once the launch velocity is known, in particular, for a situation where the acceleration is constant, as follows:

$$V(t) = V_L - At \qquad \text{Eq. (2)}$$

where,
V(t)=instantaneous velocity at time t;
A=in-flight acceleration; and
t=point in time for which the instantaneous velocity is calculated.

In practice, however, the acceleration of the arrow during flight may vary, for example, due to wind currents, changes in drag force resulting from arrow deflection (pitch and yaw) which will change the orientation of the shaft and vanes relative to the axis of forward motion of the arrow, changes in drag force resulting from decreased velocity as the arrow travels downrange, etc. Thus, a further refinement of the approach described above can be employed to determine instantaneous values of velocity in flight by, for example, approximating the acceleration data by a linear function or by higher order functions depending upon the embodiment. Thus, where the electronic apparatus 18 provides acceleration data for all or a portion of an arrow's flight, a function that provides a close approximation of the relationship between the values of acceleration and time can be determined (for example, the points in time from launch to impact). According to one embodiment, the approximated (or modeled) acceleration curve is employed because it can reduce the effects of "noise" (for example, caused by cross-axis sensitivity of the accelerometer or acceleration data resulting from arrow-shaft deflection in-flight) found in the actual data provided by the electronic apparatus 18. According to an alternate embodiment, the actual data is used to provide the acceleration A used to determine instantaneous velocity. According to a further embodiment, the actual acceleration data is filtered to reduce the acceleration data noise and improve the precision of the approach. In one embodiment, the filter is a low-pass filter with a cutoff frequency of 30-80 Hz.

Once the function is established it can be employed to determine instantaneous velocity for any point during the flight of the arrow. Eq. 3 provides a linear function to approximate the acceleration during flight in accordance with one embodiment:

$$a(t) = C_1 t + C_2 \quad \text{Eq. (3)}$$

where the function $a(t)$ includes two constants $C_1$ and $C_2$ having values that are calculated to provide the approximation between the curve provided using the linear function and the curve provided by the actual acceleration data recorded in flight. In accordance with some embodiments, the values of the constants $C_1$ and $C_2$ are determined to provide the closest approximation (or match) between the plot of the actual acceleration data and the curve provided by the function of Eq. 3.

According to some embodiments, a curve fitting tool is employed to determine the value of the constants $C_1$ and $C_2$ included in Eq. 3. According to one embodiment, the curve fitting employs an approach including a minimum mean square error (MMSE) to find the values of the constants $C_1$ and $C_2$. According to another embodiment, the curve fitting employs an approach including a method of least squares. Further, although Eq. 3 describes a linear function, in alternate embodiments, other polynomial functions including non-linear functions (for example, quadratic, cubic, etc.) can be employed to approximate the curve provided by the actual acceleration data from an arrow's flight. In addition, polynomials of various classifications can be employed including monomial, binomial and trinomial polynomials. Regardless of the specific function $a(t)$ used to provide the curve of arrow acceleration in-flight, once established the function can be employed to determine the instantaneous velocity of the arrow at various points in-flight.

According to the following embodiment, the velocity at launch $V_L$ is also employed in the approach for determining instantaneous velocity for the case of non-constant acceleration. According to this embodiment, the general form of Eq. 1 is employed to determine $V_L$. In this case, however, the term $AT^2/2$ is replaced by the double integration of acceleration in time $a(t)$.

In accordance with this embodiment, given $V_L$, the instantaneous velocity at any point of flight of the arrow can be determined for the case of linear acceleration using Eq. 4, as follows:

$$V(t_x) = V_L - \int_0^{t_x} a(t)\,dt = V_L - \int_0^{t_x} (C_1 t + C_2)\,dt \quad \text{Eq. (4)}$$

where, $t_x$ equals the point in time for which the instantaneous velocity is determined. Eq. 4 provides for integration that begins at a time $t$ equal to zero. According to some embodiments, the time $t$ equals zero corresponds to the point in time at which the instantaneous velocity at launch, $V_L$, is determined.

Further, according to one embodiment, the time $t$ equals zero corresponds to a point in time at which the bow string 96 reaches the neutral point N as it travels forward to propel the arrow downrange. However, in other embodiments, the time $t$ equals zero (and the point in time at which the instantaneous velocity at launch, $V_L$, is determined) is the point in time other than the point in time the bow string 96 reaches the neutral point N as it travels forward. For example, it may be a point in time when the nock 86 disengages from the bow string, for example, whether the arrow's release from the bow string 96 occurs at a point forward of the neutral point N or a point rear of the neutral point N.

According to a further embodiment, the distance traveled by the arrow for a given point in time can be found using Eq. 5, as follows:

$$d(t) = V_L t_x - \int_0^{t_x} \left( \frac{C_1 t^2}{2} + C_2 t \right) dt = V_L t_x - \frac{C_1 t_x^3}{6} - \frac{C_2 t_x^2}{2} \quad \text{Eq. (5)}$$

where,
d=distance traveled
t=time generally
$t_x$=point in time for which the distance is determined From the preceding, Eq. 6 provides the following relationship where d equals a total flight distance D and $t_x$ equals the total time of flight, for example, a total time of free-flight:

$$D = V_L T - \frac{C_1 T^3}{6} - \frac{C_2 T^2}{2} \quad \text{Eq. (6)}$$

Further, according to this embodiment, the velocity at target impact $V_I$ (i.e., the point in time at which free flight is complete in this example) can be determined using Eq. 7, as follows:

$$V_I = V_L - \frac{C_1 T^2}{2} - C_2 T \quad \text{Eq. (7)}$$

Once the instantaneous velocity is known for the arrow's flight, a user need simply provide a mass of the arrow to determine instantaneous values of kinetic energy and momentum, for example, from launch to impact. As described herein, in some embodiments, the acceleration data or other sensor output can be communicated to a docking station or other form of base station, and the resulting values can be determined and then plotted together or separately versus time (and/or distance). This information can provide the user with a graphical representation that illustrates the change in velocity, kinetic energy and/or momentum versus the change in time and/or distance as the arrow travels downrange.

According to one embodiment, the kinetic energy of the arrow can be determined for a point of the arrow's flight using Eq. 8 as follows:

$$E(t) = \frac{1}{2} m v^2(t) \quad \text{Eq. (8)}$$

where,
E=kinetic energy at time t
m=total mass of the arrow; and
v=velocity at time t.

Thus, to determine the kinetic energy of the arrow for a point in time $t_x$ of the arrow's flight the instantaneous velocity for the time $t_x$ (i.e., the velocity $v(t_x)$) is employed in Eq. 8.

Similarly, according to one embodiment, the momentum of the arrow can be determined for a point of the arrow's flight using Eq. 9 as follows:

$$M(t) = mv(t) \quad \text{Eq. (9)}$$

where,
M=momentum at time t
m=total mass of the arrow; and
v=velocity at time t.

Accordingly, to determine the momentum of the arrow for a point in time $t_x$ of the arrow's flight the instantaneous velocity for the time $t_x$ (i.e., the velocity $v(t_x)$) is employed in Eq. 9.

According to another embodiment, the kinetic energy of a ballistic projectile such as an arrow or bullet is sometimes determined according to Eq. 10, as follows:

$$E = \left(\frac{1}{2G}\right)mv^2 \quad \text{Eq. (10)}$$

where,
E=kinetic energy
G=gravitational force or 32.17 ft/s²
m=total mass of the arrow; and
v=velocity.

According to some embodiments, the electronic apparatus can acquire flight-data that is used to determine the average values of a flight, for example, the average speed, the average kinetic energy, the average momentum, the average levels of acceleration, etc. Where an average speed is generated, the electronic apparatus need only determine the time of flight, i.e., the occurrence of launch and impact events. Accordingly, in one such embodiment, the electronic apparatus does not include an accelerometer and employs the shock sensor to determine the launch and impact events.

In accordance with another embodiment, an electronic apparatus can be employed to determine a drag coefficient of an arrow in flight. This approach can also employ a calibration shot such that a user need only enter a distance of the arrow's flight for a single shot (i.e., the "calibration shot"). Flight data provided by the calibration shot (for example, time of flight, acceleration data and other data provided by the electronic apparatus 18 for the calibration shot) can then be employed to determine the value of the drag coefficient. When the electronic apparatus 18 is used with the same arrow the drag coefficient can be employed to determine the instantaneous values of velocity and/or kinetic energy and momentum without knowing the flight-distance for the other shots. Referring now to Eq. 11, a general relationship between acceleration and velocity provides approximate instantaneous values, as follows:

$$a(t) = Kv(t)^2 \quad \text{Eq. (11)}$$

where:
a(t)=acceleration at time t;
K=drag coefficient; and
v(t)=velocity at time t.

Thus, given a known acceleration and corresponding known velocity determined with data provided by the calibration shot (using a known distance and known time-of-flight) the drag coefficient K is determined as:

$$K = \frac{a}{v^2} \quad \text{Eq. (12)}$$

Once the drag coefficient K for a particular arrow is determined, instantaneous values of velocity, kinetic energy and momentum can be determined for other shots taken with the arrow without the need to determine either the flight-distance or the time-of-flight. For example, in one embodiment, the instantaneous velocity at a point in time $t_x$ is determined according to Eq. 13, as follows:

$$V(t_x) = \sqrt{\frac{a(t_x)}{K}} \quad \text{Eq. (13)}$$

where,
$a(t_x)$=acceleration at time $t_x$
K=drag coefficient determined from calibration shot According to some embodiments, an iterative approach is employed to find an optimized value for the drag coefficient K such that Eq. 11 is valid for a majority of the data collected during a calibration shot and v(t) is determined using Eq. 4. A further result provided by this approach is that a curve provided by a plot of a(t) as determined from the acceleration data for the calibration shot closely matches a curve provided by a plot of $a_v(t)$. According to this embodiment, the curve $a_v(t)$ represents the acceleration versus time for the calibration shot as derived by determining and employing a value of drag coefficient K using Eq. 12. That is, the curve a(t) represents the observed data while the curve $a_v(t)$ represents the data calculated using the drag coefficient K, for example, the optimized value of the drag coefficient K.

Further, the estimated value of the drag coefficient K can be changed in an iterative fashion to achieve the closest fit between the curve a(t) and the curve $a_v(t)$. According to one embodiment, the value of the drag coefficient K is adjusted to minimize the mean square error according to Eq. 14, as follows:

$$R = \sum_{0}^{T} (a(t) - a_v(t))^2 \quad \text{Eq. (14)}$$

where,
R=mean square error;
T=total time-of-flight;
a(t)=acceleration as provided by sensor(s) included in the electronic apparatus for the calibration shot; and
$a_v(t)$=acceleration determined from the estimated velocity for the calibration shot.

According to another embodiment, the estimated value of the drag coefficient K is adjusted to minimize the mean absolute error.

It is worth noting that the drag coefficient K for a given flight of an arrow is dependent upon both the physical characteristics of the arrow and environmental conditions. Eq. 15 illustrates an approach for determining an approximate value of the drag coefficient in accordance with a further embodiment, as follows:

$$K \approx \frac{\pi}{8} \cdot C \cdot d_{shaft}^2 \cdot \rho_{air} \quad \text{Eq. (15)}$$

where,
C=ballistic coefficient of the arrow;
d=diameter of the arrow shaft; and
$\rho_{air}$=density of air.

Because the density of air will vary based on both temperature and altitude, according to one embodiment, it is recommended that a calibration shot be taken for each arrow in use for each set of environmental conditions, for example, at the start of a shooting session. With the drag coefficient K is established for a particular arrow at a given set of environmental conditions, a user can proceed to determine instantaneous velocity for any additional shot taken with the electronic apparatus employed with that arrow under those environmental conditions. As mentioned above, the preceding approach can allow a user to employ the electronic apparatus 18 to collect data from which instantaneous velocity, kinetic energy and/or momentum can be determined for a wide range of shots in a single visit to the archery range without the need to determine either the flight-distance or the time-of-flight for the additional shots.

As should be recognized, the calibration shot need not be the first shot taken, but can be any shot taken with a particular arrow during a shooting session where the distance of flight (for example, the distance to the target) is known. Thus, the calibration shot can be the first shot, the last shot or a shot taken at some point between the two. Further, where environmental conditions remaining substantially unchanged between two separate shooting sessions, a user can employ a calibration shot taken with an arrow during a first shooting session and then later employ the drag coefficient K determined in the first shooting session at later shooting sessions.

Further, it can be advantageous to take the calibration shot at or near a maximum distance to provide the greatest accuracy for the value of the drag coefficient K. According to some embodiments, the accuracy of the flight-distance directly affects an accuracy of the values derived from the flight-data because the flight-distance is used to determine the launch velocity $V_L$, as described above. Thus, the percentage inaccuracy provided by inaccuracies in the distance measurement can be decreased by using a long shot as the calibration shot. For example, a 6 inch error in the flight-distance provided by the user has a much greater affect on the accuracy of modeled data for a shot taken at 10 yards than it does for a shot taken at 50 yards.

According to some embodiments, a ballistic coefficient is determined using the flight-data for one or a plurality of shots for an arrow. In one embodiment, the ballistic coefficient is determined using Eq. 15 where each of the drag coefficient, the density of the air at the time of the shot(s) and the diameter of the arrow shaft are known. According to another embodiment, a standard arrow projectile is used a model (or reference) ballistic coefficient and the ballistic coefficient of other arrows is determined as a ratio of ballistic efficiency compared to the standard model arrow, for example, such an approach is currently used for determining the ballistic coefficient of bullets.

According to some embodiments, the acceleration data referred to in the preceding approaches, and where employed in any of Eqs. 1-15 in these embodiments, is acceleration data for acceleration in a direction of the longitudinal axis of the arrow, for example, an x-axis of the accelerometer. Thus, according to some embodiments, the sensors included in the electronic apparatus 18 include a single axis accelerometer oriented to provide acceleration data for acceleration in a direction of the longitudinal axis of the arrow. According to alternate embodiments, a plurality of single axis accelerometers are employed where at least one of the single axis accelerometers is oriented to provide acceleration data for acceleration in a direction of the longitudinal axis of the arrow. According to still further embodiments, a multi-axis accelerometer is employed where at least of the sensors included in the accelerometer is oriented to provide acceleration data for acceleration in a direction of the longitudinal axis of the arrow. In one embodiment, the accelerometer is oriented to locate a sensing element coincident with the longitudinal axis of the arrow. According to another embodiment, the accelerometer is oriented to locate a sensing element parallel to, but offset from, the longitudinal axis of the arrow.

According to some embodiments, the electronic apparatus includes a multi-axis accelerometer whose output can be employed to determine the pitch of the arrow. As used herein, the term "pitch" refers to an angle of the arrow shaft relative to the horizontal plane. Thus, the arrow shaft has a pitch of zero degrees when it is level. For purpose of this description, a positive pitch refers to a condition where the arrowtip is raised higher (has a greater elevation) than the nock (also referred to the proximate end of the arrow) when referenced to the horizontal plane, while a negative pitch refers to a condition where the nock is raised higher than the arrowtip. Thus, although the preceding Eqs. 1-15 can employ accelerometer values for dynamic acceleration resulting from the arrow motion and/or shock events involving the arrow, a determination of the arrow's pitch (for example, the pitch prior to release) can be calculated based on the static acceleration of gravity.

According to one embodiment, the accuracy of the values determined from the flight-data provided by the electronic apparatus is improved where the multi-axis accelerometer is employed to determine the pitch of the arrow immediately prior to the arrow's release. In particular, in one embodiment, the pitch angle is determined at a point in time at or immediately prior to detection of the arrow's launch (for example, detection of arrow launch with either or both of the shock sensor and the accelerometer). According to a further embodiment, the pitch angle is employed to improve the accuracy of the velocity calculations by allowing the accuracy of the flight-distance to be improved to reflect the parabolic nature of the arrow's flight. The preceding approach may be particularly well suited to situations where the archery is a relatively long distance from the target. In these situations, the archer must generally raise the point-of-aim to reach the target and the parabolic flight is more pronounced to compensate for the arrow's loss of speed and elevation in-flight.

According to embodiments where the accelerometer includes a FIFO, one or more data measurements of the accelerometer stored in the FIFO at, or immediately preceding) the time of launch (for example, data concerning acceleration sensed by the x, y and z axes) are used to determine the arrow's pitch at the time of the measurement. For example, where a FIFO includes 32 samples from the measurement of the x, y and z axes at the time of launch these 32 samples are available to determine the arrow's pitch immediately prior to the arrow's release.

In addition to the preceding, the electronic apparatus 18 included in an arrow can provide a user with other useful information. According to one embodiment, an accelerometer output is employed to determine an amount of vibration in the arrow during flight by detecting the dynamic acceleration of the arrow in one or more axes. For example, the accelerometer output can be employed to determine instantaneous values of vibration that can be provided as discrete values or plotted versus time-of-flight and/or flight distance. Such an approach can allow a user to determine how much vibration is transmitted to an arrow when shot from a particular bow, how the vibration changes in flight and the effect on arrow-vibration following changes or adjustments to equipment and/or shooting technique. Thus, the electronic apparatus 18 can be employed to assist a user in equipment tuning to improve the flight stability of the arrow, and as a result, improve the consistency and accuracy of the performance of the archery equipment. The preceding result can assist the archer in improving the consistency and accuracy of their shooting.

According to some embodiments, data concerning radial vibrations experienced by the arrow is used in an evaluation of archery systems. In a further embodiment, a magnitude of the radial vibration experienced by the arrow is used in an evaluation of archery systems. As used with reference to apparatus, systems and methods for vibration detection and analysis in an arrow, the term "radial" means radial relative to a longitudinal axis of the arrow, for example, radial to a central longitudinal axis.

According to one embodiment, the vibration at the start of free-flight is evaluated to determine the efficiency and/or effectiveness of the energy transfer from the bow to the arrow where, for example, larger magnitudes of vibration are indicative of a less effective energy transfer and less stable arrow flight. According to a further embodiment, the magnitude and/or rate of change in arrow-shaft vibration (as indicated by the sensor output) in-flight is used to evaluate different arrow configurations relative to one another. For example, arrow shaft vibration analysis can be employed to evaluate: different types of vanes or fletching; the effectiveness of arrow vibration dampeners; arrowtip mechanical design (comparing the flight of different broadheads, for example); and arrowtip mass (comparing the flight of different arrowtips of differing mass, for example). Further, vibration analysis can be employed to evaluate the affect of the different aerodynamic properties of the components included in the arrow. For example, the system 112 can be employed to evaluate how the flight stability of the arrow may change with different equipment configurations.

According to one embodiment, a three axis accelerometer is included in the electronic apparatus and the values of the accelerometers or the accelerometer output for the y and z axis can be employed to determine the stability of an arrow in flight. As is known to those of skill in the art, archery equipment tuning is generally an incremental process in which a user makes an adjustment to either or both of the bow or the arrow and the related equipment, shoots one or more arrows to determine the stability of the arrows flight (for example, as determined by the accuracy, paper tuning, and/or walk back tuning), and then makes further adjustments in subsequent flights if the preceding adjustments and flights are not satisfactory. However, it has been determined that the use of an electronic apparatus 18 can provide a user with meaningful information to improve the process of archery equipment tuning. For example, referring now to Eq. 16, a magnitude of vibration may be determined, as follows:

$$M=\sqrt{G_y^2+G_z^2} \qquad \text{Eq. (16)}$$

M=magnitude of vibration;
$G_y$=acceleration in the y axis; and
$G_z$=acceleration in the z axis.

Figure 15:
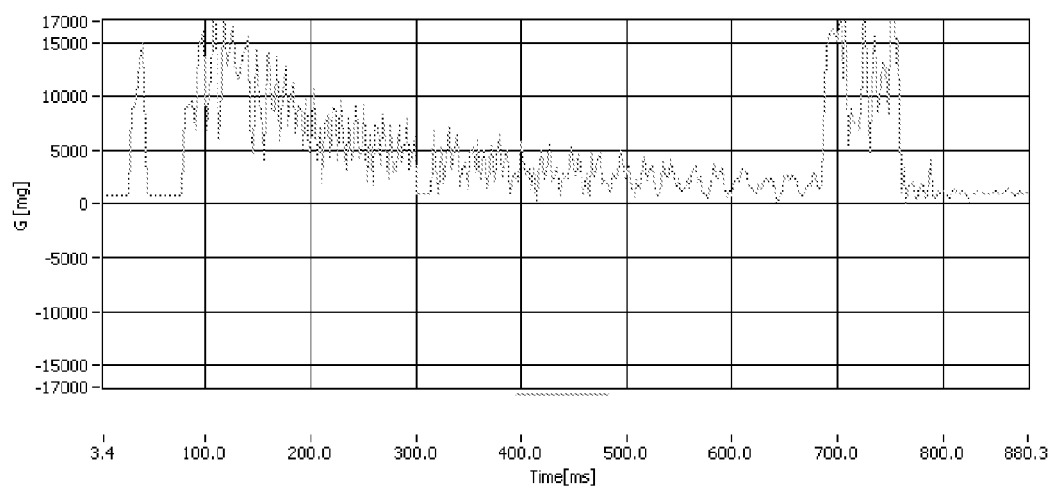
FIG. 15 illustrates a plot of accelerometer output versus time in accordance with one embodiment.

The values of $G_y$ and $G_z$ can be provided by the acceleration data generated by an accelerometer included in the electronic apparatus 18. The plot illustrated in FIG. 15 provides a plot of an output of one axis of a multi-axis accelerometer in millig versus time for a flight of an arrow. The plot illustrates an initial rapid increase in accelerometer output at launch followed by a more gradual decrease in acceleration until impact.

The plot illustrated in FIG. 15 includes a step-like change in the accelerometer output signal at the start of free-flight and again at the start of target-impact. According to one embodiment, x-axis accelerometer data is plotted and the step change at launch is in the negative direction while the step change at impact is in the positive direction. According to a further embodiment, the step changes are employed to determine time-of-flight of the arrow.

The values of M can be generated by one or more forces that act upon on arrow when shot from a bow. For example, as is known by those of skill in the art, even an arrow that has a shaft stiffness (spine) that is configured appropriately for the bow with which it is used, will still show some level of deflection when it is launched from the bow. This deflection is a result of the acceleration force applied at the nock of the arrow to propel the arrow forward to overcome the inertia of the arrow at rest just prior to launch. Further, in addition to actual spine deflection, shaft vibrations (for example, in the form of a high frequency compression wave that may not create a deflection or bend of the arrow shaft) may be transmitted through the material of the arrow shaft as a result of the arrow's launch.

Where an accelerometer is located on electronic apparatus 18 included in an arrow and a first axis (x axis) is located along the longitudinal axis of the arrow, the y and z axes are necessarily perpendicular to the longitudinal axis, however, their direction relative to earth coordinates will vary as the arrow rotates in flight.

According to further embodiments, the evaluation of the vibration data provided by the electronic apparatus is quantified to determine a rate of change after launch, and the frequency of the vibrations. In other embodiments, any of an instantaneous magnitude of acceleration, average magnitude and a sum of magnitudes can be employed. Further, although Eq. 16 illustrates the use of two axes of acceleration data for vibration analysis, x-axis acceleration data can be used in combination with the y and z axes data in some embodiments.

Further, data acquired in the time domain can be measured for frequency content to assist in analysis of the flight dynamics. In accordance with one embodiment, frequency analysis is performed on accelerometer output data, for example, to perform vibration analysis on at least a portion of the arrow's flight-data. Thus, in some embodiments, the accelerometer output is sampled in the time domain (see the preceding plot) and stored in the flight-data. This portion of the flight-data can be measured in the frequency domain to determine the frequency peaks that occur, for example, using a Fast Fourier Transform (FFT). The frequency peaks can be evaluated for changes in frequency and/or magnitude as changes are made to equipment to evaluate arrow-flight and equipment performance. More specifically, the frequency analysis can be employed to evaluate the static spine of the arrow, the dynamic spine of the arrow and the efficiency of energy transfer from the bow to the arrow, as just some examples.

Modern archery equipment can shoot arrows at speeds of 350 ft/s or greater. Consequently, the electronic apparatus 18 should be designed to quickly and accurately capture substantial amounts of data, for example, data provided by one or more of the plurality of sensors included in the electronic apparatus. Further, it is desirable to minimize the power consumption of the electronic apparatus 18 to the extent possible. Thus, in one embodiment, the electronic apparatus 18 employs a page-write operation to communicate flight-data from the microcontroller (for example, microcontroller 52) to the memory (for example, the memory 56) where it can be stored for later retrieval and processing. In general, the page-write operation allows flight-data to be more quickly stored in memory and reduces the power consumption for the data storage operation by organizing flight-data in larger datablocks before the data is communicated from the microcontroller memory (for example, RAM internal to the microcontroller) to memory external to the microcontroller (for example, EEPROM).

In some embodiments, the data is stored in RAM on a page-by-page basis where each page of data includes a plurality of bytes of information and is organized such that the quantity of data included in the page matches the size of a region for storing the page in EEPROM. Such a page-write operation can include the communication, from the microcontroller to the EEPROM, of: a starting address in the EEPROM for storage of the page of data; and the plurality of bytes included in the page. According to one embodiment, the page size includes a total of 64 bytes of data. This approach can be advantageous because it allows for a faster data communication and storage than, for example, communication and storage of data on a byte-by-byte basis. The preceding result is achieved because a write cycle for the EEPROM memory typically has the same time interval and consumes the same energy when writing a single byte as it does when writing a page that includes a plurality of bytes.

The contents of the each page of data can vary depending upon the embodiment. For example, the microcontroller can receive a variety of inputs during a single arrow-flight including: acceleration data provided from one or a plurality of accelerometers; accelerometer interrupt signals; and input signals provided by the shock sensor (i.e., a change of state from NO to NC contact or vise versa). Additional inputs can also be provided to the microcontroller including inputs provided by other types of sensors included in the electronic apparatus 18. According to one embodiment, the electronic apparatus 18 includes a 3-axis accelerometer, a shock sensor and employs EEPROM memory with 64 byte page. According to this embodiment, each page is assembled in the microcontroller memory before communication to the EEPROM where each page includes: 6 samples for each of x, y and z axis of accelerometer output (where the size of each sample is two bits), for a total of 36 bytes; and 28 additional bytes available for shock sensor output data (1 bit), accelerometer interrupts (2 bits) and 5 or more additional inputs. The sample rate of the accelerometers and/or other sensors can affect the contents of each page. For example, in another embodiment, having a faster accelerometer sample rate, a greater percentage of each page can be dedicated to accelerometer output data.

According to one embodiment where the EEPROM is 256 Kbytes in size, each page is 64 bytes in size. In other embodiments, the EEPROM includes 256 or 512 Kbytes and the page size can vary from 64-256 bytes depending upon the embodiment.

According to another embodiment, a single-byte write mode is employed. In this embodiment, an address in the EEPROM is identified and a single byte (8 bits) of data is communicated from the microcontroller memory to the external memory.

According to various embodiments, the flight-data is communicated from the electronic apparatus 18 to the base station over a single-wire communication bus. Thus, where the electronic apparatus 18 is included in an arrow-mounted device, the single-wire bus can be employed to communicate flight-data including any of the time-of-flight and sensor output data. The sensor output data can include acceleration data (for example, accelerometer output data) for one or a plurality of axes. In accordance with various embodiments, the other sensor output data can be communicated over the single wire bus, for example, the output of the shock sensor, magnetometer, etc.

According to some embodiments, a base station (for example, the base station 112 or the docking station 156) is programmed with algorithms which when executed perform one or more of the equations included above. In one embodiment the microcontroller included in the base station is programmed with the algorithms, for example, in flash memory included in the microcontroller. According to these embodiments, the electronic apparatus 18 is programmed with embedded software to store flight-data in memory during a flight of the arrow. The flight-data is communicated from the electronic apparatus to the base station where it is processed, for example, using one or more of the algorithms included in the base station. Thus, the base station can execute the programs to provide information concerning one or more flight characteristics. In further embodiments, the base station is also programmed with software to display the results of the processing of the flight-data, for example, to display information concerning one or more flight characteristics.

In some embodiments, a system (for example, the system 110) can provide a plot of arrow flight characteristics in flight. For example, the system 110 can provide plots of any of the following alone or in any combination with one another or other plots: acceleration versus time (for one or a plurality of axes); acceleration versus distance (for one or a plurality of axes); velocity versus time; velocity versus distance; vibration magnitude versus time; vibration magnitude versus distance; vibration frequency plots; kinetic energy versus time; kinetic energy versus distance; momentum versus time; and momentum versus distance. According to one embodiment, the plots are displayed in a display (for example, the display 136) included in a base station.

Further, in some embodiments, the flight-data is processed to determine the trajectory, elevation and/or drop of the arrow for one or a plurality of points of the arrow's flight. According to these embodiments, the drop of the arrow can be determined from the point of launch to a point of target-impact. In one embodiment, this information can be employed by an archer to establish the settings of one or more pins that are included in a bow-sight.

Thus, in some embodiments, a software program is capable of processing flight-data (for example, acceleration data) to generate information concerning an arrow's flight. According to some embodiments, the information can be employed to evaluate a performance of an archery system including an arrow and a bow. Thus, the data provided by the electronic apparatus can be employed to evaluate the performance of only the bow, only the arrow, each of the bow and the arrow, and may also include an evaluation of a performance of an archer alone or in combination with any of the preceding. Accordingly, some embodiments can be employed for the purpose of tuning archery equipment. Such software will run in the memory of a data processing device (CPU) of the base station or other computing device and may be stored in non-volatile storage means, such as for example a hard disk drive. The non-volatile storage means is loaded with the computer software from a computer readable storage means, such as a compact disk or DVD. Access to the base station may be provided by a telecommunications network, so that data is provided to the apparatus over the network, which performs the method of the present invention and then outputs the results, possibly again over the network.

According to some further embodiments, a user can also provide data concerning a point-of-impact on a target in combination with flight-data to evaluate a performance of archery equipment or the performance of an archer. For example, where a target includes scoring rings, a user can enter the score of one or a plurality of arrows and/or shots for processing in combination with the flight-data collected by the electronic apparatus 18. According to another embodiment, a user can enter the distance from a point of aim for one or a plurality of arrows and/or shots for processing in combination with the flight-data. Further, elevation and/or left right location relative to the point of aim can be employed alone or along with the distance from the point of aim. The preceding target-impact information can be used in combination with arrow flight-data for a variety of types of analysis that can be performed on arrow-flight and archery equipment performance. According to some embodiments, acceleration data recorded by the electronic apparatus 18 is employed with the target impact information to evaluate the performance (for example, the tuning) of the arrow, bow, archer or any combination of the preceding. In one embodiment, frequency analysis is performed on the acceleration data from one or more axes and the results are analyzed in combination with the target impact information.

A CD-ROM and flash memory are two examples of a computer readable storage media containing a copy of the controlling software which configures and controls the base station and/or electronic apparatus to perform the operations described above. This software may exist or be distributed on a wide variety of media types including CR-ROM, DVD, Floppy Disk, Fixed Disk, Flash Memory, and others.

According to some embodiments, the electronic apparatus 18 includes a GPS device. These embodiments can be employed in a tracking device that continues to provide data after the flight of the arrow is complete (that is, post-flight). For example, the electronic apparatus 18 can be designed to lodge in an animal struck by the arrow including the apparatus even should the arrow exit the target. According to these embodiments, the animal's location can be determined based on a GPS signal transmitted from the electronic apparatus.

According to further embodiments, the electronic apparatus 18 transmits flight-data to the base station on a substantially real-time basis, for example, via RF transmission.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of determining an instantaneous speed of an arrow shot from a bow having a bow string, the method comprising acts of:
   determining a time-of-flight of the arrow, at least in part, by employing an apparatus included in the arrow to determine a moment in time when a start of a free-flight of the arrow occurs, the start of the free-flight occurring when a proximate end of the arrow reaches substantially a neutral position of the bow string;
   determining a distance between a location from which the arrow is loosed and a location of a target-face; and
   determining the instantaneous speed of the arrow by employing at least each of: a) the time-of-flight; and b) the distance.

2. The method of claim 1, further comprising an act of determining the time-of-flight with data provided by at least one of a shock sensor and an accelerometer included in the apparatus.

3. The method of claim 2, further comprising an act of determining a start of a free-flight of the arrow with data provided by at least one of the shock sensor and the apparatus.

4. The method of claim 2, further comprising an act of determining an impact of the arrow with the target-face with data provided by at least one of the shock sensor and the accelerometer.

5. The method of claim 2, further comprising an act of determining the time-of-flight with data provided by each of the shock sensor and the accelerometer.

6. The method of claim 1, further comprising acts of:
   determining a time-of-launch based at least in part on a first step-change in an output signal of the accelerometer; and
   determining a time-of-impact based at least in part on a second step-change in an output of the accelerometer.

7. The method of claim 1, further comprising an act of determining a total time of flight of the arrow, wherein the total time of flight includes the free flight and at least one of a launch-phase and an impact-phase.

8. A method of analyzing a flight of an arrow, the arrow including an arrow shaft, the method comprising:
   collecting data, with a sensing system included in the arrow, during at least one flight of the arrow; and
   performing frequency analysis on the collected data to determine a vibration of the arrow shaft.

9. The method of claim 8, wherein the act of collecting includes an act of sampling the data in a time-domain.

10. The method of claim 9, wherein the act of performing frequency analysis includes an act of measuring the collected data in the frequency domain.

11. The method of claim 10, wherein the act of measuring includes an act of applying a Fast Fourier Transform to the collected data.

12. The method of claim 8, wherein the act of performing frequency analysis includes an act of determining frequency peaks in the collected data.

13. The method of claim 8, further comprising evaluating the vibration using vibration data collected for a longitudinal axis of the arrow shaft.

14. The method of claim 8, further comprising evaluating the vibration using vibration data collected for at least one axis perpendicular to a longitudinal axis of the arrow shaft.

15. The method of claim 8, further comprising evaluating the vibration using vibration data collected for a longitudinal axis of the arrow shaft and vibration collected for at least one axis perpendicular to a longitudinal axis of the arrow shaft.

16. The method of claim 15, wherein the sensing system includes a multi-axis accelerometer, and wherein the method further comprises evaluating the vibration using accelerometer output data for at least two axes of the multi-axis accelerometer.

17. The method of claim 15, further comprising performing frequency analysis to identify frequency peaks in the collected data for the at least one axis perpendicular to the longitudinal axis.

18. The method of claim 8, further comprising determining the vibration transmitted to the arrow shaft when shot from a selected bow.

19. The method of claim 18, further comprising determining how to improve a consistency and accuracy of the selected bow based at least in part on the collected data.

20. The method of claim 8, further comprising employing results of the frequency analysis to determine how a flight stability of the arrow changes with different equipment configurations.

21. The method of claim 1, further comprising determining the instantaneous speed of the arrow by employing acceleration data provided by the apparatus in combination with the time-of-flight and the distance.

22. A method of determining an instantaneous speed of an arrow shot from a bow having a bow string, the method comprising acts of:
- determining a time-of-flight of the arrow, at least in part, by employing an apparatus included in the arrow to determine a moment in time when a start of a free-flight of the arrow occurs following a launch phase, the start of free-flight occurring when a proximate end of the arrow reaches substantially a neutral position of the bow string;
- determining a distance between a location from which the arrow is loosed and a location of a target-face; and
- determining the instantaneous speed of the arrow by employing at least each of: a) the time-of-flight; and b) the distance.

23. The method of claim 22, further comprising determining the instantaneous speed of the arrow by employing acceleration data provided by the apparatus in combination with the time-of-flight and the distance.

* * * * *